(12) United States Patent
Takahashi et al.

(10) Patent No.: US 8,148,695 B2
(45) Date of Patent: Apr. 3, 2012

(54) NUCLEAR MEDICAL DIAGNOSIS APPARATUS

(75) Inventors: Isao Takahashi, Hitachi (JP); Takafumi Ishitsu, Hitachi (JP); Yuichiro Ueno, Hitachi (JP); Tomoyuki Seino, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/107,282

(22) Filed: May 13, 2011

(65) Prior Publication Data

US 2011/0215254 A1    Sep. 8, 2011

Related U.S. Application Data

(63) Continuation of application No. 12/837,877, filed on Jul. 16, 2010, now Pat. No. 7,964,849, which is a continuation of application No. 11/861,977, filed on Sep. 26, 2007, now Pat. No. 7,795,590.

(30) Foreign Application Priority Data

Sep. 29, 2006  (JP) ................................ 2006-269559
Sep. 14, 2007  (JP) ................................ 2007-238660

(51) Int. Cl.
*G01T 1/164* (2006.01)
(52) U.S. Cl. ......... 250/363.03; 250/363.02; 250/363.04; 250/370.09; 378/4; 378/10; 378/19; 378/98.8
(58) Field of Classification Search ............. 250/363.03, 250/363.02, 363.04, 370.09; 378/4, 8, 10, 378/19, 98
See application file for complete search history.

(56) References Cited

U.S. PATENT DOCUMENTS

| 4,670,840 A | 6/1987 | Freundlich |
| 5,291,293 A | 3/1994 | Kapan |
| 5,436,659 A | 7/1995 | Vincent |
| 5,473,663 A | 12/1995 | Hsieh |
| 6,047,039 A | 4/2000 | Flohr |

(Continued)

FOREIGN PATENT DOCUMENTS

JP    64-080345 A1    3/1989

(Continued)

OTHER PUBLICATIONS

Astronomy & Astrophysics Supplement Series, 122, Apr. 1997, "The high energy instrument PDS on-board the BeppoSAX x-ray astronomy satellite", F. Frontera et al, pp. 357-369.

*Primary Examiner* — David Porta
*Assistant Examiner* — Djura Malevic
(74) *Attorney, Agent, or Firm* — Mattingly & Malur, PC

(57) ABSTRACT

A PET apparatus comprises a plurality of detector units in the circumferential direction, wherein the detector unit includes a plurality of unit substrates therein, and wherein the unit substrate includes: a plurality of detectors upon which a γ-ray is incident; and an analog ASIC and digital ASIC for processing a γ-ray detection signal outputted by each of the detectors. The analog ASIC includes two slow systems having mutually different time constants, each of which outputs a pulseheight value. A noise determination part of the digital ASIC determines whether a relevant detection signal is an intended γ-ray detection signal or a noise based on a correlation between the pulseheight values, and a noise counting part counts the number of times of noise determination, and a detector output signal processing control part controls the signal processing with respect to an output signal from a relevant detector based on the count.

4 Claims, 19 Drawing Sheets

U.S. PATENT DOCUMENTS

| | | |
|---|---|---|
| 6,741,754 B2 | 5/2004 | Hamilton |
| 7,026,622 B2 | 4/2006 | Kojima et al. |
| 7,109,490 B2 | 9/2006 | Fuchs et al. |
| 7,297,958 B2 | 11/2007 | Kojima |
| 7,795,590 B2 | 9/2010 | Takahashi |
| 2002/0012417 A1 | 1/2002 | Bruder et al. |
| 2003/0108147 A1 | 6/2003 | Kojima et al. |
| 2004/0135091 A1 | 7/2004 | Nolewaika |
| 2004/0190676 A1 | 9/2004 | Kojima |
| 2004/0190683 A1* | 9/2004 | Winklemann ............... 378/207 |
| 2006/0180769 A1 | 8/2006 | Hackenschmied et al. |
| 2008/0203309 A1 | 8/2008 | Frach et al. |

FOREIGN PATENT DOCUMENTS

| | | |
|---|---|---|
| JP | 2002-243858 | 8/2002 |
| JP | 2003-255048 | 9/2003 |
| JP | 2006-98411 | 4/2006 |

* cited by examiner

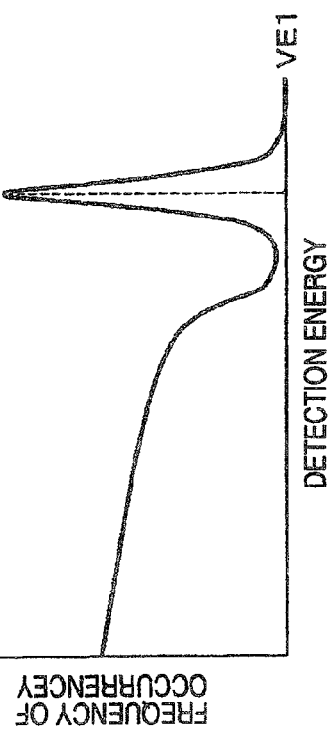
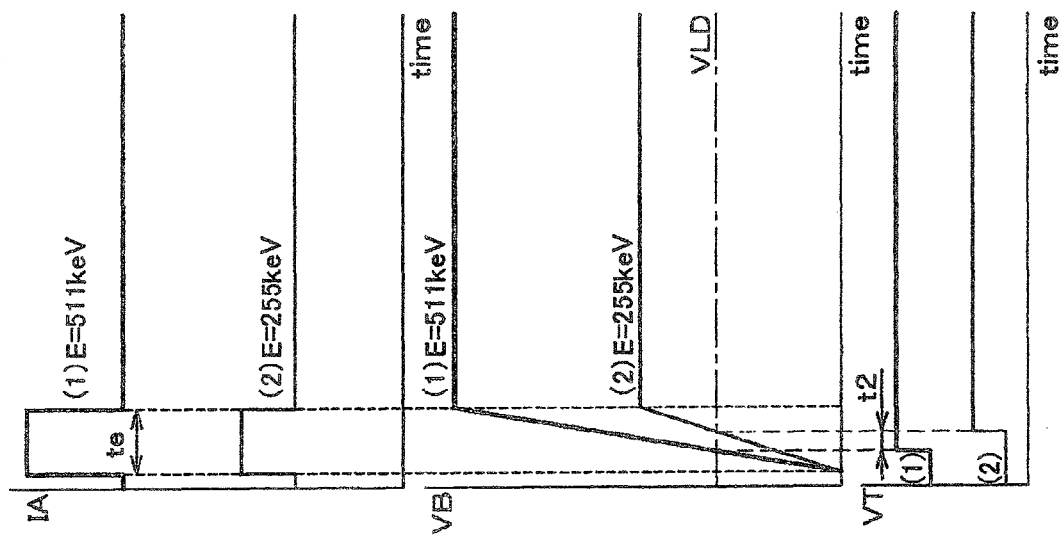
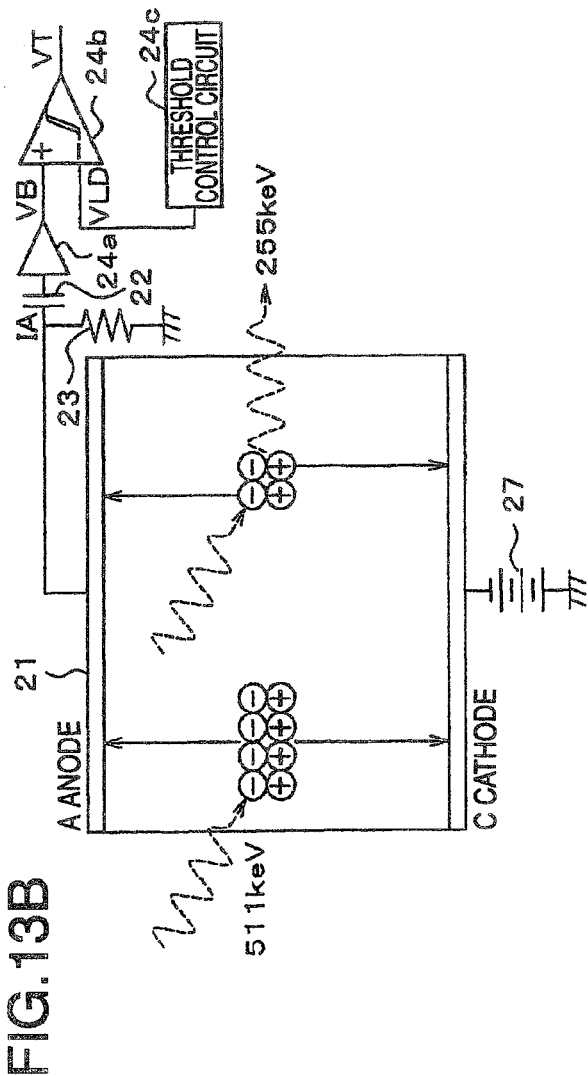

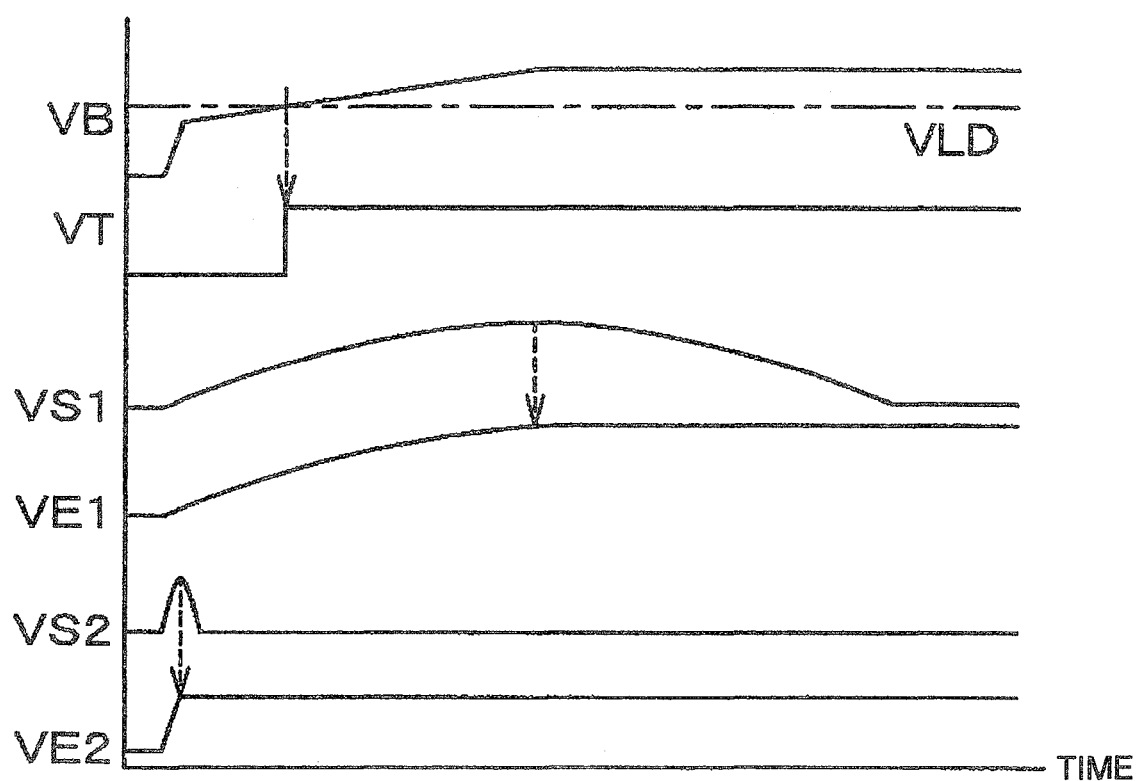

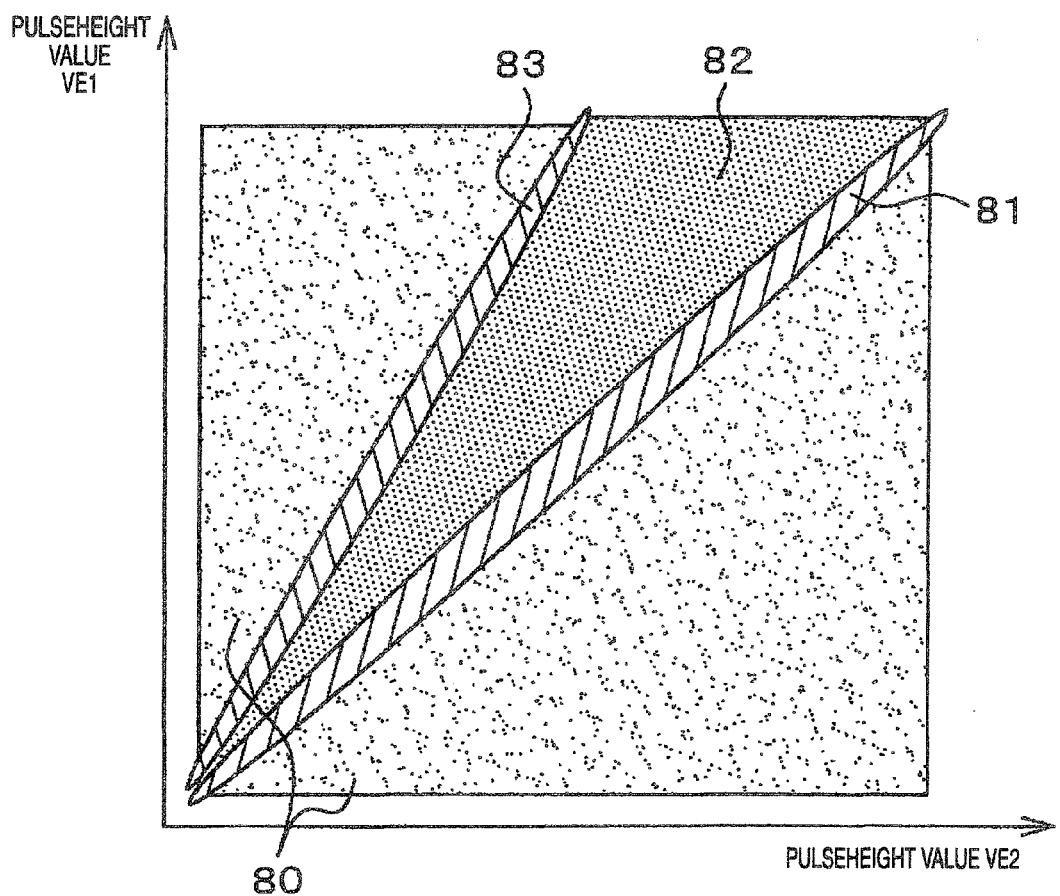

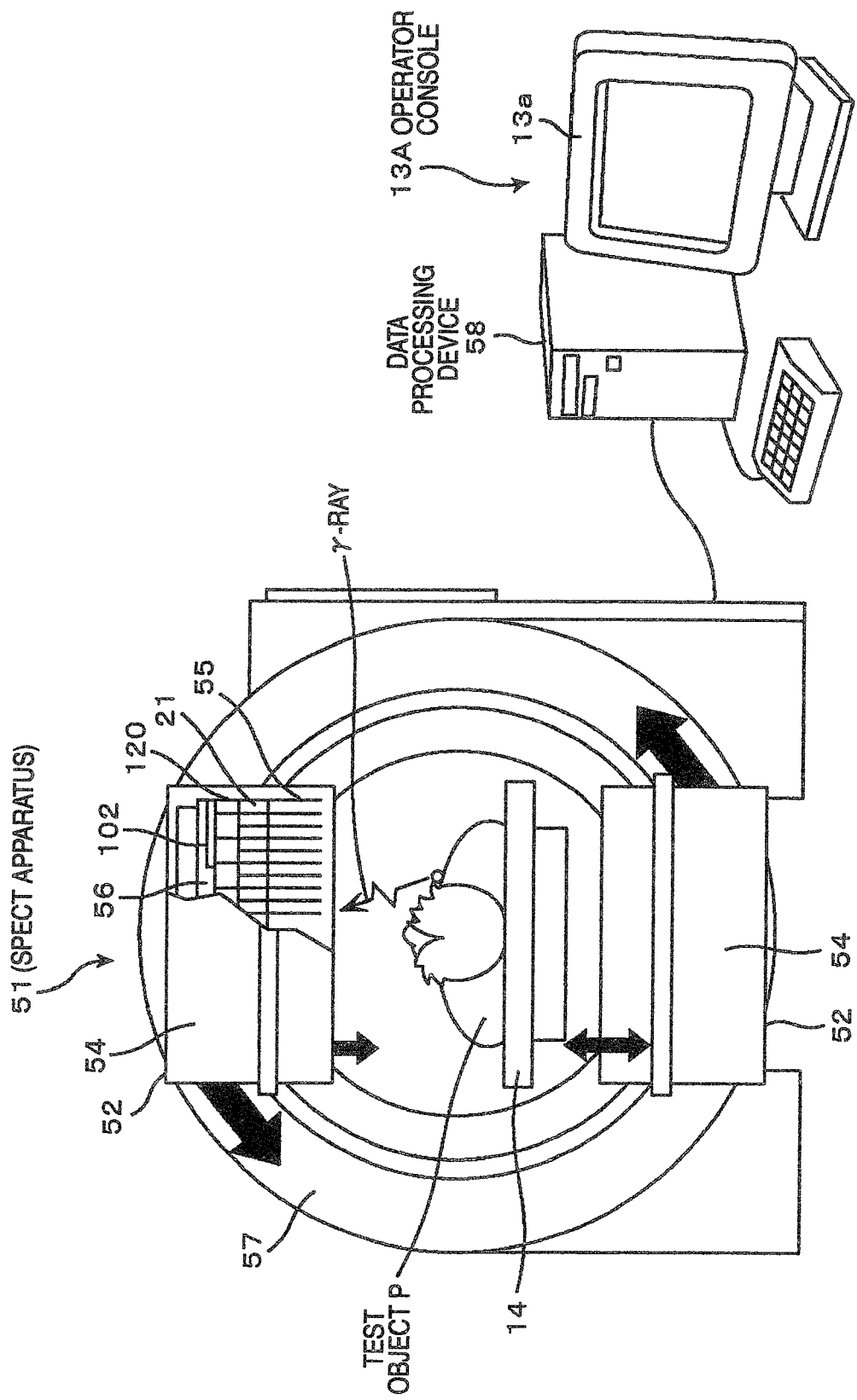

NUCLEAR MEDICAL DIAGNOSIS APPARATUS

This is a continuation application of U.S. patent application Ser. No. 12/837,877, filed Jul. 16, 2010, now allowed, which is a continuation of U.S. application Ser. No. 11/861,977, filed Sep. 26, 2007, now U.S. Pat. No. 7,795,590, the contents of which is hereby incorporated by reference into this application.

The present application claims priority from Japanese patent application No. 2006-269559 filed on Sep. 29, 2006, and No. 2007-238660 filed on Sep. 14, 2007.

BACKGROUND OF THE INVENTION

The present invention relates to nuclear medical diagnosis apparatuses, and in particular relates to a positron emission computed tomography apparatus (hereinafter, referred to as a PET apparatus) that is one type of the nuclear medical diagnosis apparatuses using radiation detectors, a single photon emission computed tomography apparatus (hereinafter, referred to as a SPECT apparatus), and a γ-camera using γ-rays passing through a test object.

Conventionally, as the radiation detectors for detecting radiation, such as γ-rays, a radiation detector using an NaI scintillator is known. In the γ-camera equipped with an NaI scintillator, radiation (γ-ray) is incident upon the NaI scintillator at an angle limited by a large number of collimators, thus interacting with an NaI crystal to emit scintillation light. This light reaches a photomultiplier or a photodiode via a light guide to become an electrical signal. The electrical signal is shaped by a measuring circuit mounted on a circuit substrate and is then sent to an external data acquisition system from an output connector. In addition, these NaI scintillator, light guide, photomultiplier, measuring circuit, circuit substrate, and the like are entirely housed in a light shielding case to block electromagnetic waves other than external γ-rays.

In addition, here, when an NaI scintillator is combined with a photomultiplier or a photodiode, this combination is defined as a radiation detector.

The radiation detector that detects radiation based on a principle different from the principle of the radiation detector combining such NaI scintillator with a photomultiplier or a photodiode is a semiconductor radiation detector equipped with semiconductor radiation detection elements using a semiconductor material, such as CdTe (cadmium telluride), CdZnTe (zinc telluride cadmium), $HgI_2$ (mercury iodide), TlBr (thallium bromide), or GaAs (gallium arsenide). In this semiconductor radiation detector, the semiconductor radiation detection element convert a charge resulting from an interaction between a γ-ray and the semiconductor material into an electrical signal, so this semiconductor radiation detector can accomplish conversions into an electric signal more efficiently than the scintillator can, and also accomplish miniaturization. Accordingly, this semiconductor radiation detector attracts much attention.

In addition, in the nuclear medical diagnosis apparatus that generates an image using a large number of such radiation detectors, there is a problem that when a noise signal mixing with an intended radiation detection signal outputted from the radiation detector is outputted from an abnormal radiation detector, i.e., a photomultiplier, a photodiode, or a semiconductor radiation detector, this noise signal is also processed during image generation.

For this reason, the conventional technique described in JP-A-2006-98411 (paragraphs [0032], and to [0039]) uses the method for detecting an abnormal semiconductor radiation detector and excluding an output signal therefrom, wherein in a PET apparatus or SPECT apparatus equipped with a plurality of semiconductor radiation detectors, semiconductor radiation detectors are arranged so as to surround the circumference of the body axis of a test object and also to be in multiple layers in the radial direction. Here, with respect to γ-rays in the radial direction passing through the semiconductor radiation detectors in multiple layers, a ratio between signals outputted by the semiconductor radiation detectors in each layer is used to determine which semiconductor radiation detector on which layer is abnormal when the ratio deviates from a predetermined ratio by a specified amount or more.

In addition, in the technique described in the above-described JP-A-2006-98411, an abnormal radiation detector can be determined only after carrying out transmission imaging or actual SPECT imaging, or PET imaging, or imaging of transmission image, and even if a noise signal is outputted from an abnormal radiation detector, a signal processing device will process an output signal including this noise signal as a radiation detection signal, thus resulting in an increase in the signal processing load of the signal processing device. Moreover, when multiple layers of semiconductor radiation detectors are disposed in the radial direction, multiple layers of semiconductor radiation detectors in the radial direction at a specific position can be determined as abnormal, but this technique can not be applied to the case where radiation detectors using a scintillator are arranged in one layer in the radial direction.

As a result, there is a problem that the generation of a SPECT image, PET image, and transmission image can not be started until the determination of a abnormal radiation detector is completed in data processing after the imaging.

SUMMARY OF THE INVENTION

The present invention has been made in view of the above problem, and it is an object of the present invention to provide a nuclear medical diagnosis apparatus that can, even without disposing multiple layers of radiation detectors, determine an abnormal radiation detector during image pickup and eliminate an adverse effect on the generated image due to a noise signal from the radiation detector.

In order to achieve the above-described objects, according to an aspect of the present invention, a signal processing device comprises: a determination unit that determines whether an output signal from a radiation detector is an intended radiation detection signal or a noise; a counting unit that counts for each radiation detector the number of times the output signal from the detector is determined as a noise; and a control unit which, based on the number of times the output signal from the detector is determined as a noise, determines the relevant radiation detector as faulty and controls so as not to process an output signal from the radiation detector that is determined as faulty.

The present invention can provide a nuclear medical diagnosis apparatus that can determine a abnormal radiation detector during image pickup and eliminate an adverse effect on the generated image due to a noise signal from the radiation detector.

Other objects, features and advantages of the invention will become apparent from the following description of the embodiments of the invention taken in conjunction with the accompanying drawings.

BRIEF DESCRIPTION OF THE DRAWINGS

FIG. 12A is a detail view of a circuit of a portion outputting the timing signal VT, wherein the semiconductor radiation detector of FIG. 4 and FIG. 5 is schematically shown in a single layer structure, and FIG. 12B is a view showing a relation among the waveform of an output current pulse IA of the detector, the waveform of an output voltage VB of a preamplifier, and the waveform of the output voltage VT of a comparator.

FIG. 13A to FIG. 13C describe that the output timing of the timing signal VT differs depending on a γ-ray detection energy which a detector detects, wherein FIG. 13A is a spectrum showing the detection energy of the detector and the detection frequency, FIG. 13B is a detail view of a circuit of a portion outputting the timing signal VT, wherein the semiconductor radiation detector of FIG. 4 and FIG. 5 is schematically shown in a single layer structure, and FIG. 13C is a view showing a relation among the waveform of the output current pulse IA of the detector, the waveform of the output voltage VB of the preamplifier, and the waveform of the output voltage VT of the comparator, and in particular is a view showing that the rising of the waveform of the output current pulse IA differs when the detection energy differs in spite of the same contribution of electron.

FIG. 14 is a view showing the output signal VB of the preamplifier of FIG. 8, and the output signals VS1 and VE1 of a waveform shaper circuit and a peak hold circuit in a first slow system, respectively, and the output signals VS2 and VE2 of the waveform shaper circuit and the peak hold circuit in a second slow system, respectively.

FIG. 15 is a correlation between the pulseheight values VE1, VE2 outputted from the first slow system and the second slow system, the correlation being used in discrimination between a γ-ray detection signal and a noise in a noise determination part in the first embodiment.

FIG. 16 is a correction value table based on the pulseheight values VE1, VE2 outputted from the first slow system and the second slow system, the pulseheight values being used for correction of a detection time in a detection time correcting part in the first embodiment.

FIG. 17 is a perspective view showing the configuration of a SPECT apparatus as a nuclear medical diagnosis apparatus concerning a second embodiment of the present invention.

DESCRIPTION OF THE INVENTION

First Embodiment

Next, a nuclear medical diagnosis apparatus, which is a suitable embodiment of the present invention, will be described suitably referring to the accompanying drawings.

In the followings, a nuclear medical diagnosis apparatus of the present embodiment, elements applied to the present embodiment, such as arrangement (layout) of each device such as analog ASIC onto a substrate, unitization of substrates, a method for determining a noise, and a method for controlling a radiation detector that is determined as faulty will be described.

In addition, the analog ASIC means an ASIC (Application Specific Integrated Circuit), i.e., an IC for a specific application, for processing analog signals, and is one type of LSI (Large Scale Integrated Circuit).

(Nuclear Medical Diagnosis Apparatus)

First, the nuclear medical diagnosis apparatus of the present embodiment is described.

Figure 1:
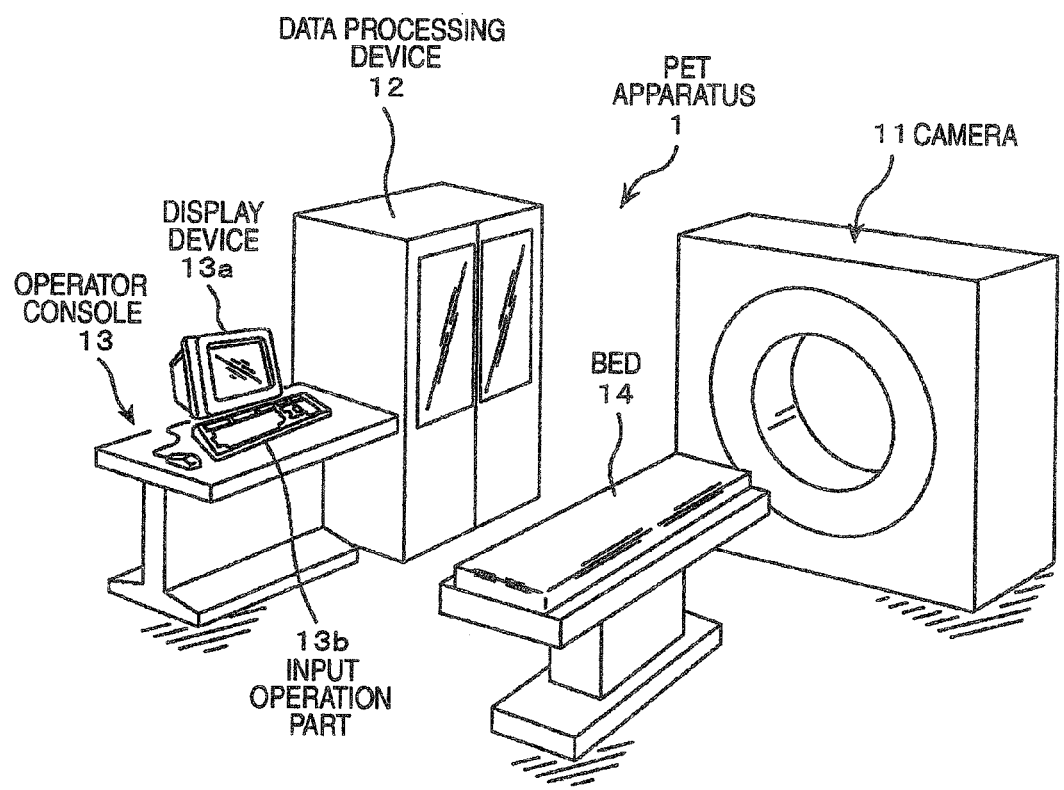
FIG. 1 is a perspective view showing the configuration of a PET apparatus as a nuclear medical diagnosis apparatus concerning a first embodiment of the present invention.

As shown in FIG. 1, a PET apparatus 1 as the nuclear medical diagnosis apparatus comprises a camera (image pickup device) 11, a data processing device 12, and an operator console 13, and the like. A test object P (see FIG. 2) is placed on a bed 14 and is imaged with the camera 11.

The operator console 13 comprises a display device 13a that displays tomographic images of the PET apparatus 1, status check results of the PET apparatus 1, and the like, and an input operation part (input unit) 13b, such as a keyboard and a mouse.

Figure 2:
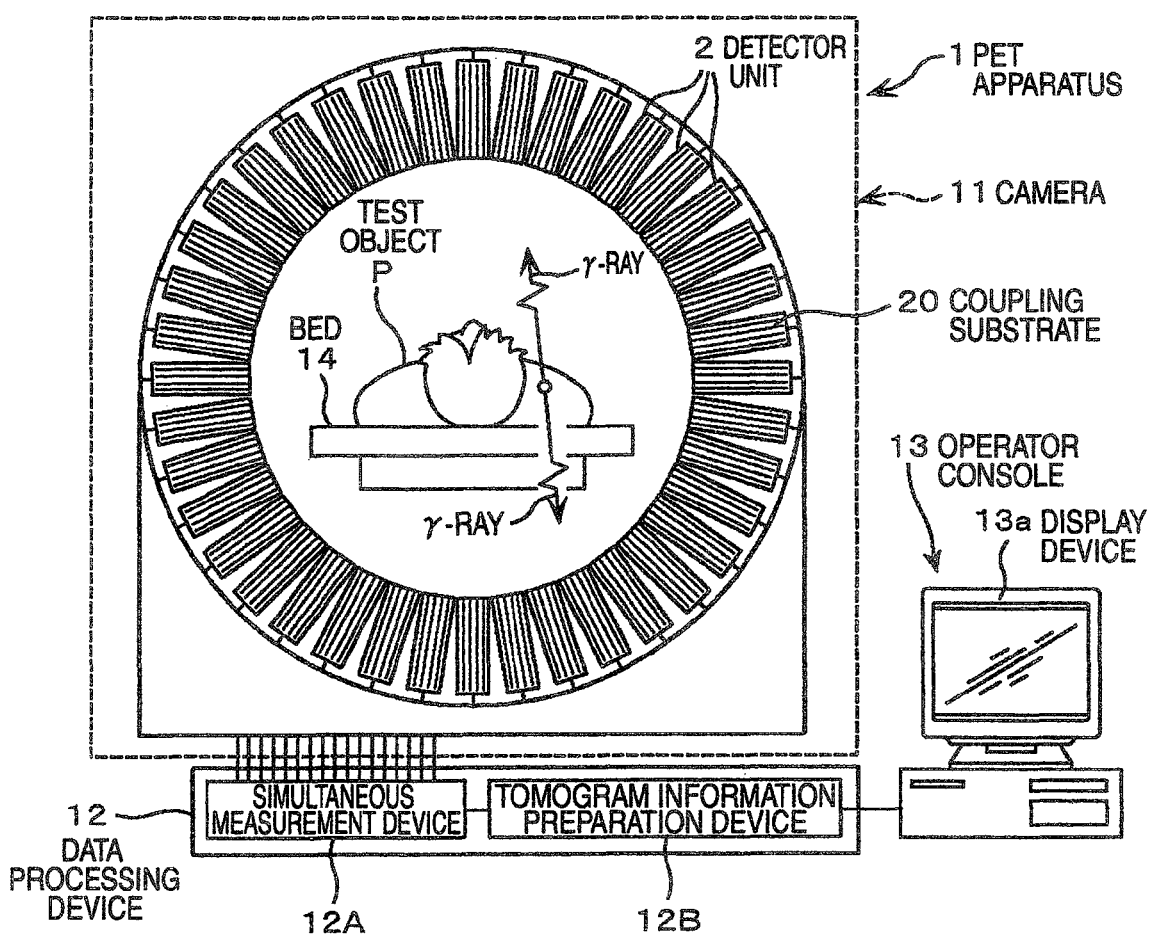
FIG. 2 is a view schematically showing a cross section in the circumferential direction of a camera of the PET apparatus of FIG. 1.

As shown in FIG. 2, inside the camera 11, in order to detect γ-rays (radiation) emitted from the test object P, a large number of detector units 2, each housing a plurality of coupling substrates (unit substrates) 20 (see FIG. 6 for details) provided with a large number of semiconductor radiation detectors (radiation detectors, hereinafter, simply referred to as detectors) 21 (see FIG. 4, FIG. 5), are arranged in the circumferential direction, whereby the γ-rays emitted from the body of the test object P are detected with the detectors 21.

The detector unit 2 includes, on the coupling substrate 20, an integrated circuit (ASIC) for measuring the detection energy and detection time of a γ-ray. Here, the detector unit 2 measures the detection energy and detection time of a detected γ-ray, detects the address of a detector 21 that detects the γ-ray, and outputs to the data processing device 12 information containing a data of the detection energy of the detected γ-ray (information on the detection energy value), a data of the detection time (detection time information), and a detector ID (detector address information) corresponding to the address of the above-described detector 21, as a packet data (information on detected radiation).

As shown in FIG. 2, the data processing device 12 includes a non-illustrated storage device, a simultaneous measurement device 12A, and a tomogram information preparation device 12B. The data processing device 12 captures a packet data (information on detected radiation). The simultaneous measurement device 12A carries out simultaneous measurement based on the packet data, in particular, a data of the detection time, and the detector ID. Then, the simultaneous measurement device 12A identifies a detection position of a γ-ray of 511 keV and stores the same into the storage device. The tomogram information preparation device 12B prepares functional images based on the identified position, and displays the same on the display device 13a.

Incidentally, the test object P is given fluoro-deoxy-glucose (FDG) containing radiopharmaceutical, e.g., $^{18}$F with a half-life period of 110 minutes. From the body of the test object P, a pair of 511 keV γ-rays (annihilation γ-rays) are emitted in approximately 180° direction with respect to each other at the time of annihilation of a positron emitted from FDG.

At this time, each detector 21 of the camera 11 surrounds the circumference of the bed 14. From the detector unit 2 to the data processing device 12, the information on the detection energy value, the detection time information, and the detector ID obtained based on a γ-ray detection signal (radiation detection signal) generated when the detector 21 interacts with a γ-ray are outputted for each detector 21 contained in the detector unit 2.

Figure 3A:
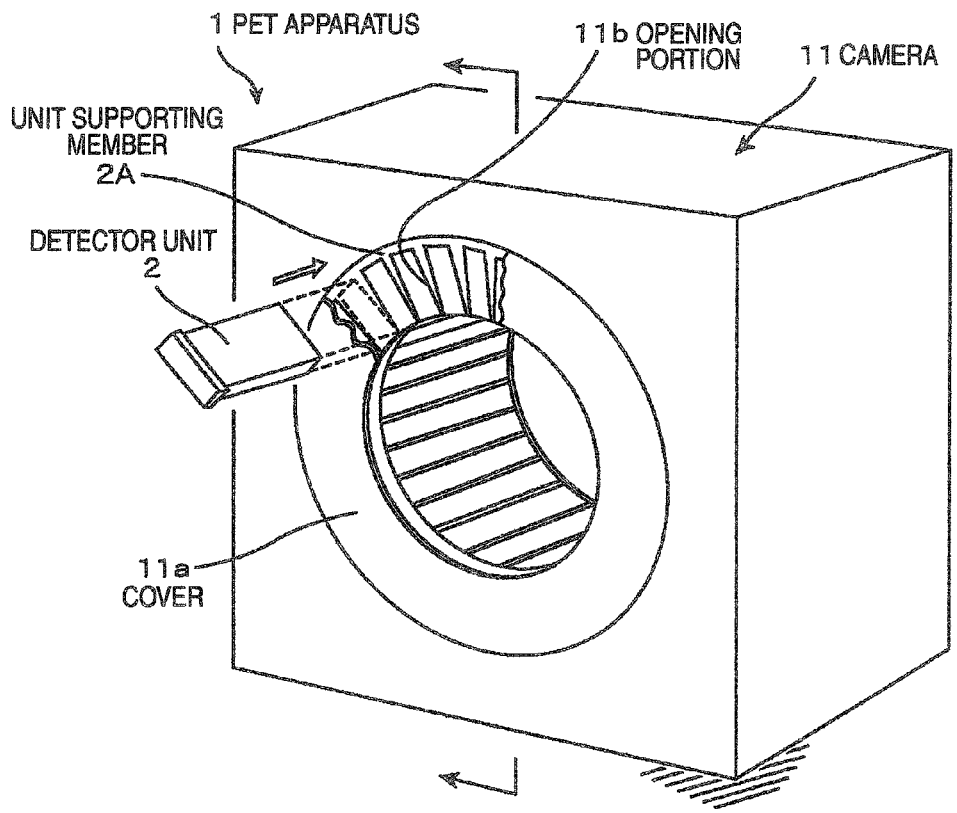
FIG. 3A is a partially cutaway perspective view of the camera, showing a configuration to mount a detector unit into the camera.
Figure 3B:
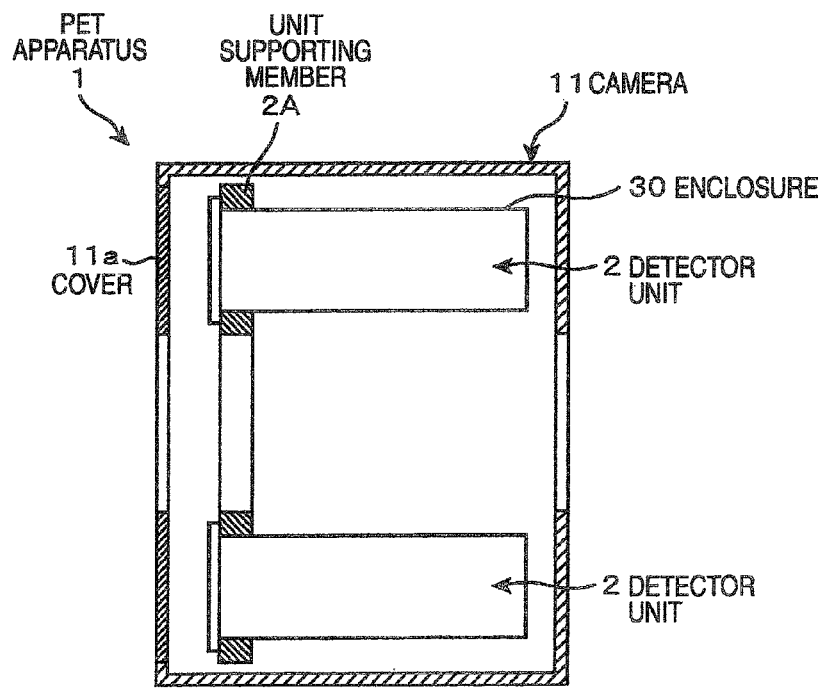
FIG. 3B is a cross sectional view showing the mounting state of the detector units in a central portion of the camera.

As shown in FIG. 3A, 60 to 70 pieces of detector units 2 are removably disposed in opening portions 11b of the camera 11 in the circumferential direction so that the inspection and maintenance may be facilitated. The detector unit 2 is mounted via a unit supporting member 2A. Moreover, as shown in FIG. 3B, the detector unit 2 is mounted to the camera 11, with one end thereof being supported on the unit supporting member 2A. The unit supporting member 2A is hollow disc-shaped (doughnut-shaped) and comprises a large number (corresponding to the number of detection units 2 to be mounted) of opening portions 11b, to each of which the detector unit 2 is mounted, in the circumferential direction of the camera 11. In order to support the detector unit 2 at one end in this manner, a flange part serving as a stopper is provided at a near side in the body axis direction of an enclosure 30 of the detector unit 2.

Incidentally, when attempting to arrange the detector units 2 as densely as possible in the circumferential direction, a circumferentially inner flange portion interferes. Then, this interfering flange portion may be eliminated from the enclosure 30 to leave a circumferentially outer flange portion. Another unit supporting member 2A may be set in the body axis direction so that the both ends of the detector unit 2 may be held with the both unit supporting members 2A.

In addition, when mounting the detector unit 2 to the camera 11, a cover 11a is removed to expose the unit supporting member 2A, so that the detector unit 2 may be inserted and mounted from the opening portion 11b until the flange part bumps against the unit supporting member. By inserting and mounting in this manner, a connection between the respective connectors of a non-illustrated power supply and signal wiring of the camera 11 and the corresponding connector of the detector unit 2 is carried out, so that the connection of signals and power supply between the camera 11 and the detector unit 2 is made.

The configurations of the detector 21, the coupling substrate 20, and the detector unit 2 will be described in detail later.

Hereinafter, the features of the present embodiment is described.
(Semiconductor Radiation Detector)

Figure 4:
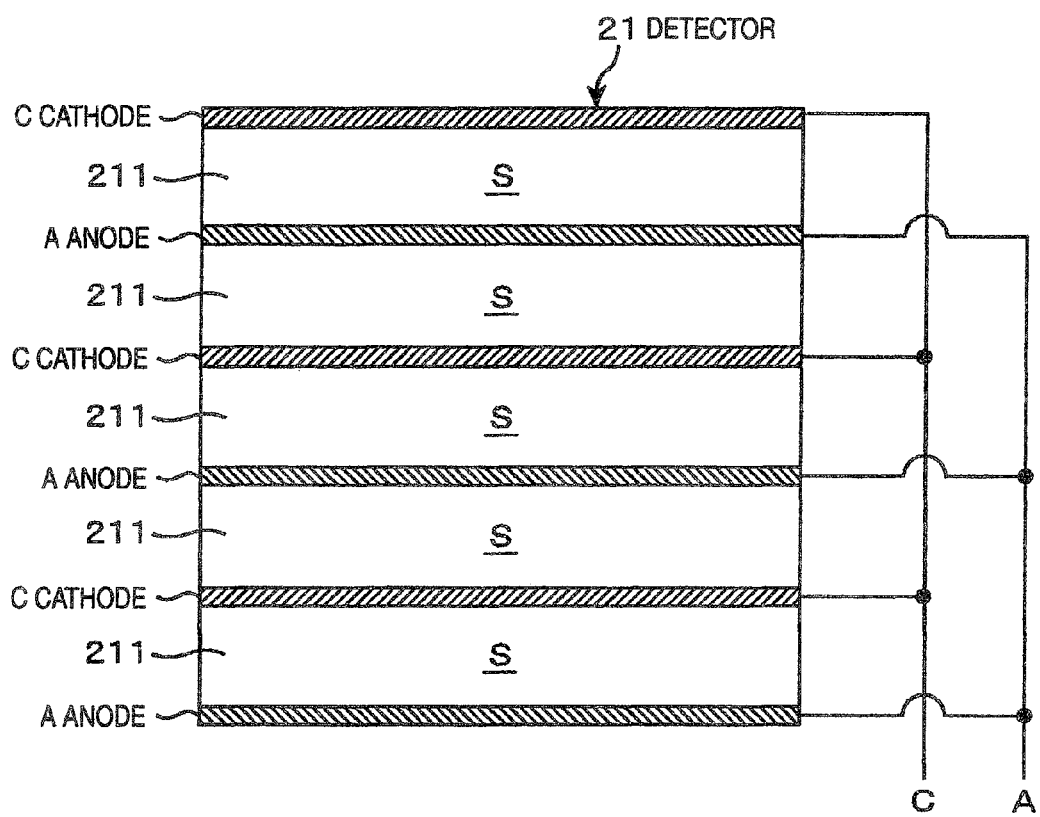
FIG. 4 is a view schematically showing the configuration of a semiconductor radiation detector.
Figure 5:
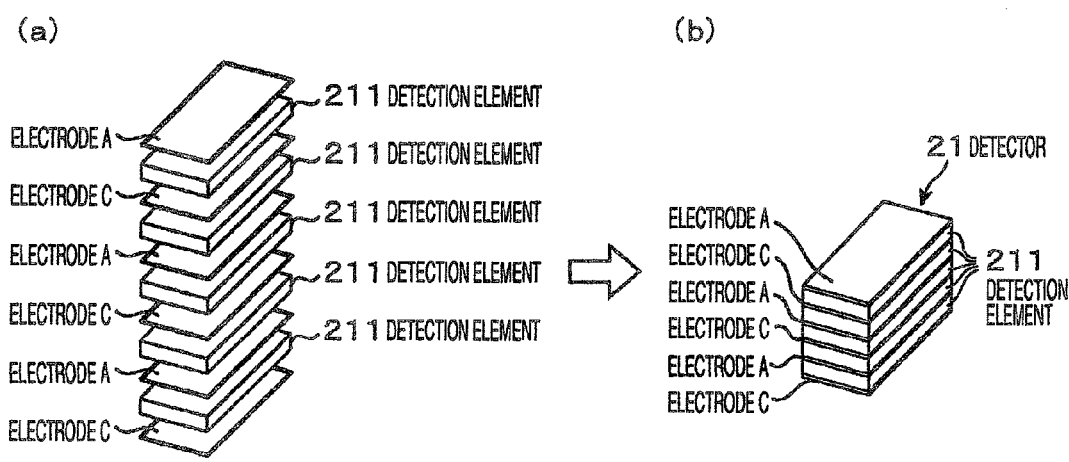
FIG. 5 shows a perspective view in (a) schematically showing constituent elements of the semiconductor radiation detector in a laminated structure of FIG. 4, and shows a perspective view of the laminated structure made by combining the constituent elements in (b).

First, the detector 21 applied to the present embodiment is described with reference to FIG. 4 and FIG. 5. FIG. 4 is a view conceptually showing a laminated structure of the detector 21, the (a) of FIG. 5 is a perspective view schematically showing detection elements and electrodes, which are component parts of the detector, and the (b) of FIG. 5 is a perspective view after laminating and integrating these.

As shown in FIG. 4, the detector 21 has a laminated structure wherein both sides of a semiconductor radiation detection element (hereinafter, referred to as a detection element) 211 composed of a plate-like semiconductor material S are covered with thin plate-like (filmy) electrodes (anode A, cathode C) and this resulting semiconductor radiation detection element is laminated in five layers, for example.

Among these, the semiconductor material S is composed of a single crystal of any one of the above-described CdTe (cadmium telluride), CdZnTe (cadmium zinc telluride), HgI$_2$ (mercury iodide), TlBr (thallium bromide), GaAs (gallium arsenide), and the like.

Moreover, for the electrode A (anode A) and the electrode C (cathode C), a material of any one of Pt (platinum), Au (gold), In (indium), and the like is used.

In addition, in the following descriptions, assume that the semiconductor material S is a sliced single crystal of CdTe. Moreover, assume that radiation to be detected is a γ-ray of 511 keV used in the PET apparatus 1.

The thickness of one layer of the semiconductor material S (detection element 211) shown in FIG. 4 ranges from 0.5 to 1.5 mm, for example. The thicknesses of the anode A and cathode C are approximately 20 μm, respectively.

In the detector 21 of a laminated structure shown in FIG. 4, the anodes A are connected to each other in common and the cathodes C are connected to each other in common, so each layer will not detect radiation independently of other layers. In other words, when a γ-ray interacts with the semiconductor material S, the detector 21 will not discriminate the occurrence of the interaction in the uppermost layer from the occurrence of an interaction in the lowermost layer, and the like. Of course, the detector 21 may be configured so as to detect an interaction for each layer.

Incidentally, the reason why such five layer structure is adopted is as follows. It is convenient as a detector if the thickness of the semiconductor material S made thin, because both the rising speed and pulseheight value of a γ-ray detection signal are increased. However, if the thickness of the semiconductor material S is thin, there will be more γ-rays passing straight through the semiconductor material S without interacting therewith. For this reason, it is intended to, while increasing the charge collection efficiency, reduce the quantity of γ-rays passing straight through the semiconductor material S and thus increase the interaction between the semiconductor material S and γ-rays, i.e., aiming at increasing the number of counts.

The configuration of the detectors 21 with such a laminated structure can provide a more excellent rising characteristic of a γ-ray detection signal and a more accurate pulseheight value, and at the same time can increase the number of counts of γ-rays interacting with the semiconductor material S, i.e., can increase the sensitivity, as well.

The area of the electrode (anode A, cathode C) preferably ranges from 4 to 120 mm². An increase of the area increases the capacitance (stray capacitance) of the detector 21, and this increase of the stray capacitance increases the noise, so it is better if the area of the electrode is small as much as possible. Moreover, charges generated at the time of detection of a γ-ray are partly stored in the stray capacitance, so if the stray capacitance increases, problems will occur that the charge amount stored in a preamplifier 24a of an analog ASIC 24 (see FIG. 7), and in turn the output voltage (pulseheight value) decreases. When CdTe is used as the detector 21, the relative dielectric constant thereof is 11, and if the area of the detector 21 is set to 120 mm² and the thickness thereof is to 1 mm, the capacitance becomes 12 pF, which can not be ignored considering that the stray capacitance of the connector of the circuit and the like is several pF. Accordingly, the area of the electrode is preferably set equal to or less than 120 mm².

Moreover, the lower limit of the area of the electrode is determined from the positional resolution of the PET apparatus 1.

In addition, although the semiconductor material S interacting with a γ-ray is assumed to be CdTe in the above description, not to mention that the semiconductor material S may be CdZnTe, TlBr, GaAs, or the like.

(Coupling Substrate; Detector Substrate and ASIC Substrate)

Figure 6:
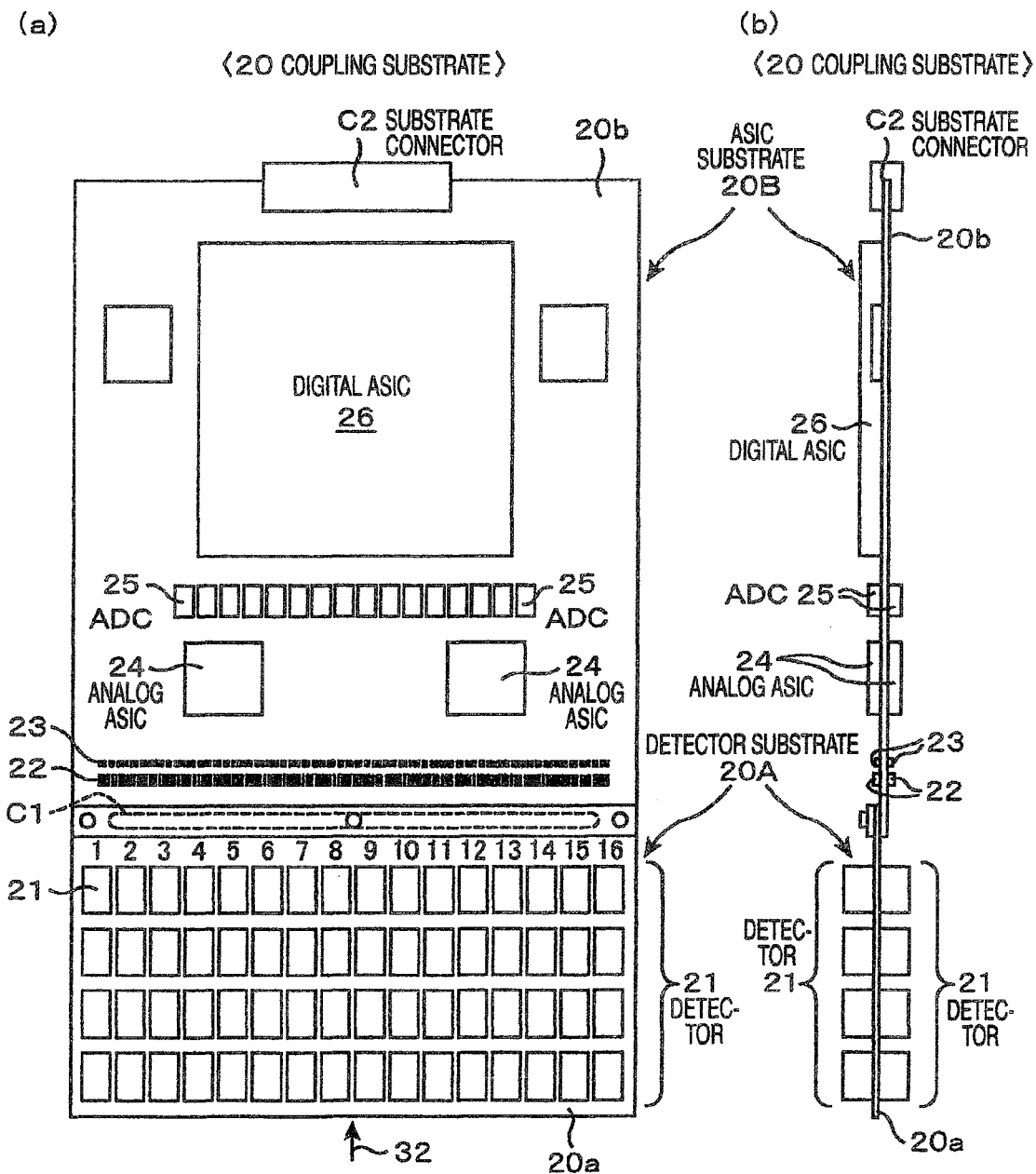
FIG. 6 shows a front view in (a) showing a coupling substrate made by coupling a detector substrate of the semiconductor radiation detector concerning the first embodiment with an ASIC substrate, and shows the side view of FIG. 6 (a) in (b).

Next, the detailed structure of the coupling substrate (unit substrate) 20 mounted in the detector unit 2 is described using FIG. 6. The (a) of FIG. 6 is a front view showing the coupling substrate, and the (b) of FIG. 6 is the side view of the (a) of FIG. 6.

The coupling substrate 20 is constructed by connecting a detector substrate 20A, on both sides of which a plurality of detectors 21 are mounted, to an ASIC substrate 20B, on both sides of which a capacitor 22, a resistor 23, an analog ASIC 24, and an analog-to-digital converter (hereinafter, referred to as ADC) 25 are mounted and on one side of which a digital ASIC 26 is mounted, via a connector C1.

(Detector Substrate)

As shown in the (a) of FIG. 6, in the detector substrate 20A, on one side of a substrate body 20a, for example, 16 detectors 21 are disposed in a horizontal row in the (a) of FIG. 6 corresponding to the body axis direction of the test object P, and furthermore, four rows of detectors 21 are disposed in the vertical direction in the (a) of FIG. 6 corresponding to the radial direction with respect to the body axis of the test object P, namely, a total of 64 detectors 21 (16 horizontally×4 vertically) are disposed in a grid pattern. Moreover, as shown in the (b) of FIG. 6, the detectors 21 are disposed similarly on the other surface of the detector substrate 20A, as well, and thus a total of 128 detectors 21 on both surfaces are disposed in one detector substrate 20A.

Here, the more the number of detectors 21, the more easily a γ-ray will be detected and also the positional accuracy at the time of detection of a γ-ray can be increased. Accordingly, the detectors 21 are disposed as densely as possible on the detector substrate 20A.

Incidentally, in the (a) of FIG. 6, in the case where a γ-ray emitted from the test object P on the bed 14 travels from the lower side to the upper side of the view (in the direction of an arrow 32, i.e., in the radial direction of the camera 11), it is more preferable that the arrangement of the detectors 21 in the horizontal direction on the detector substrate 20A be made dense, because the number of γ-rays passing straight (the number of γ-rays passing through a gap between the detectors 21) can be reduced. Accordingly, the detection efficiency of γ-rays can be increased and thus the spatial resolution in the body axis direction of images obtained can be increased.

In addition, because the detectors 21 are disposed on both sides of the substrate body 20a as shown in the (b) of FIG. 6, the detector substrate 20A of the present embodiment can be commoditized by mounting the substrate body 20a on both sides thereof, rather than in the case where the detectors 21 are disposed on only one side. Accordingly, the number of substrate bodies 20a can be reduced by half, and the detectors 21 can be arranged more densely in the circumferential direction of the body axis of the test object P. At the same time, as described above, the number of detector substrates 20A (coupling substrate 20) can be reduced by half.

In the above description, in the camera 11, horizontally 16 detectors 21 are disposed in the body axis direction of the test object P, but not limited thereto. For example, in the camera 11, horizontally 16 detectors 21 may be disposed in the circumferential direction with respect to the body axis of the test object P.

Moreover, in the detector 21, the surfaces of the electrodes A and C shown in the (b) of FIG. 5 may be arranged in parallel to the surface of the substrate body 20a, or the surfaces of the electrodes A and C may be arranged perpendicular to the surface of the substrate body 20a.

For the purpose of collecting charges, a potential difference (voltage) of 500 V is applied between the anode A and cathode C of each detector 21 by means of a high voltage power supply 27 (see FIG. 8), for example. This voltage is supplied from the ASIC substrate 20B side to the detector substrate 20A side via the connector C1 (see the (a) of FIG. 6). Moreover, a γ-ray detection signal outputted when each detector 21 detects a γ-ray is supplied to the ASIC substrate 20B side via the connector C1. For this reason, in the substrate body 20a of the detector substrate 20A, there are provided non-illustrated on-board wiring (used for voltages applied to the detector, used for signal transfer) that connects the connector C1 to each detector 21. This on-board wiring has a multilayer structure. The detector substrate 20A includes the connector C1 connected to the on-board wiring to be connected to each detector 21, and is connected to a connector C1 of the later-described ASIC substrate 20B.

(ASIC Substrate)

Next, the ASIC substrate 20B having ASICs mounted thereon is described with reference to FIG. 6. As shown in the (a) of FIG. 6, in the ASIC substrate 20B, two analog ASICs 24 are mounted on both sides of a substrate body 20b, respectively, and one digital ASIC 26 is mounted on one side. In other words, one ASIC substrate 20B includes a total of four analog ASICs 24 and one digital ASIC 26.

Moreover, the ASIC substrate 20B includes 16 ADCs 25 on one side of the substrate body 20b, respectively, i.e., a total of 32 ADCs 25. Moreover, the capacitors 22 and resistors 23 of a number corresponding to the number of detectors 21 are mounted on both sides of one substrate body 20b. Moreover, in order to electrically connect these capacitors 22, resistors 23, analog ASICs 24, ADCs 25, and digital ASIC 26 to each other, non-illustrated on-board wiring is provided on the ASIC substrate 20B (substrate body 20b) as in the above-described detector substrate 20A. This on-board wiring has also a laminated structure.

The arrangement and on-board wiring of each of these circuit elements 22, 23, 24, 25, and 26 are made in such a manner that signals supplied from the detector substrate 20A may be supplied to the capacitor 22, resistor 23, analog ASIC 24, ADC 25, and digital ASIC 26 in this order.

In addition, the ASIC substrate 20B includes: the connector C1 for making electrical connection with the detector substrate 20A, the connector C1 being connected to the on-board wiring connected to each capacitor 22; and a substrate connector C2 for making electrical connection with the data processing device 12 side (the later-described unit integrating FPGA side).

(Connection Configuration Between Detector Substrate and ASIC Substrate)

As shown in the (b) of FIG. 6, in the detector substrate 20A and the ASIC substrate 20B, overlap portions that mutually overlap are provided near the end portions to connect the mutual connectors C1 existing in these overlap portions. This connection is removably (separably and connectably) made with fastening screws or the like.

In addition, the reason why such connection is made is as follows. If the coupling substrate 20, to which the detector substrate 20A and the ASIC substrate 20B are connected (coupled), is horizontally supported at one end (cantilevered suspension) or supported at both ends, then a force deflecting or bending this coupling substrate 20 downward will act on the center portion (connection portion) of the coupling substrate 20. Accordingly, if the connection portion is made by abutting the end faces to each other, the connection portion will easily deflect or easily bend. For this reason, it is intended to increase the strength of the connection portion.

As the connector C1, for example, a spiral contact (registered trademark) is used in order to provide excellent electrical connection. The spiral contact (registered trademark) has a characteristic that a ball-like connection terminal is in contact with the spiral contact on a wide area, thus achieving an excellent electrical connection.

In addition, if the ball-like connection terminal is provided in the ASIC substrate 20B side, the spiral contact is provided on the detector substrate 20A side, while if the ball-like connection terminal is provided in the detector substrate 20A side, the spiral contact is provided on the ASIC substrate 20B side.

By using such electrical connection structure between the detector substrate 20A and the ASIC substrate 20B, signals can be transmitted from the detector substrate 20A to the ASIC substrate 20B at a low loss. If the loss decreases, the energy resolution as the detector 21 will be improved, for example.

Although in the above-described structure one detector substrate 20A is connected to the ASIC substrate 20B, the detector substrate may be divided into multiple portions. For example, horizontally eight and vertically four detectors 21 may be mounted on one substrate to connect two detector substrates to the ASIC substrate.

Moreover, the detector substrate 20A and the ASIC substrate 20B may be constructed with one through-substrate body.

Next, the configuration and function of each circuit element on the ASIC substrate will be described with reference to FIG. 7 to FIG. 9.

Figure 7:
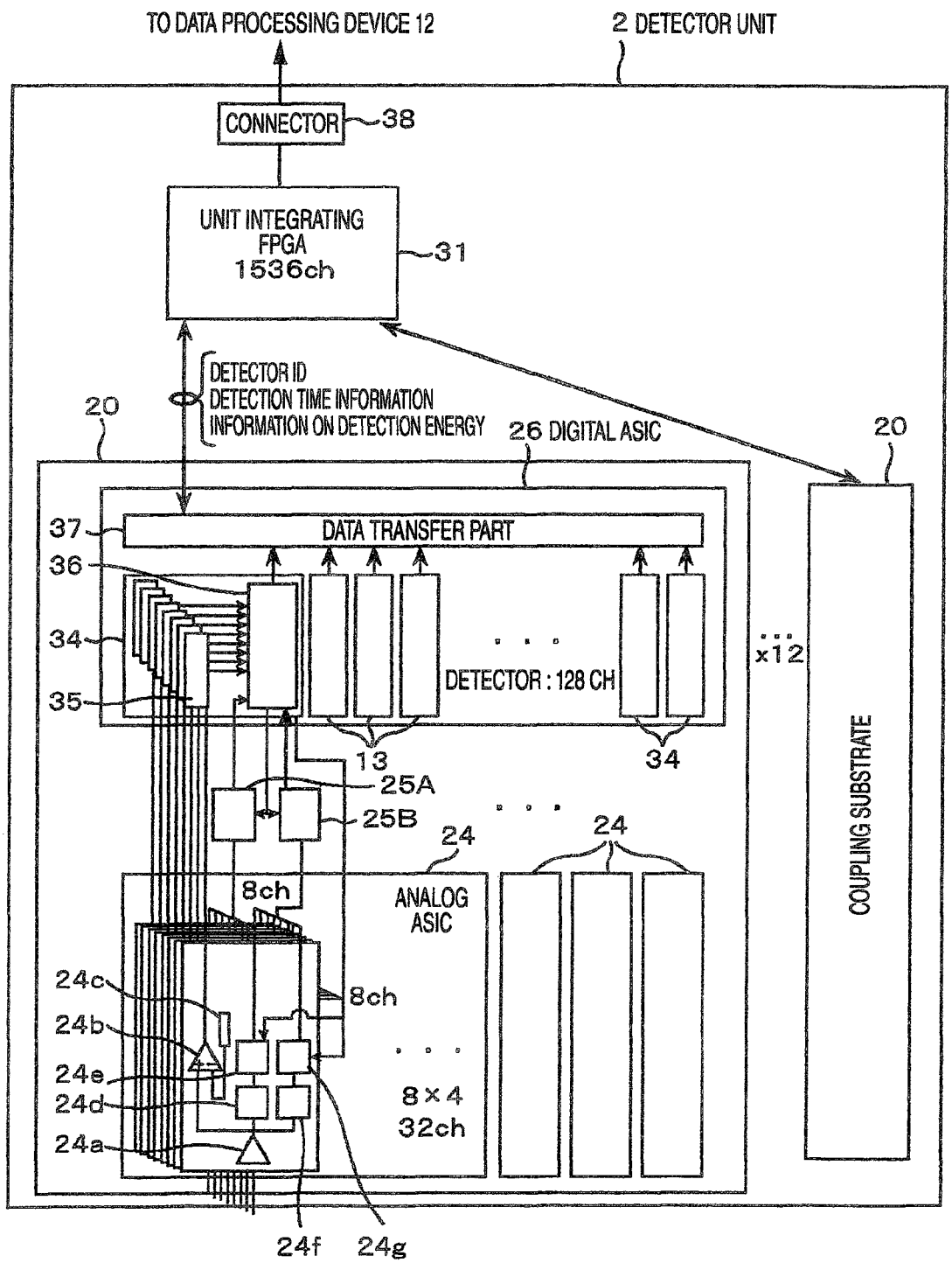
FIG. 7 is a block diagram showing a schematic configuration of the digital ASIC, and a connection relation between an analog ASIC and the digital ASIC.

FIG. 7 is a block diagram of the detector unit showing a schematic configuration of each of the analog ASIC and digital ASIC, and a connection relation between the analog ASIC and the digital ASIC.

(Analog ASIC)

Figure 8:
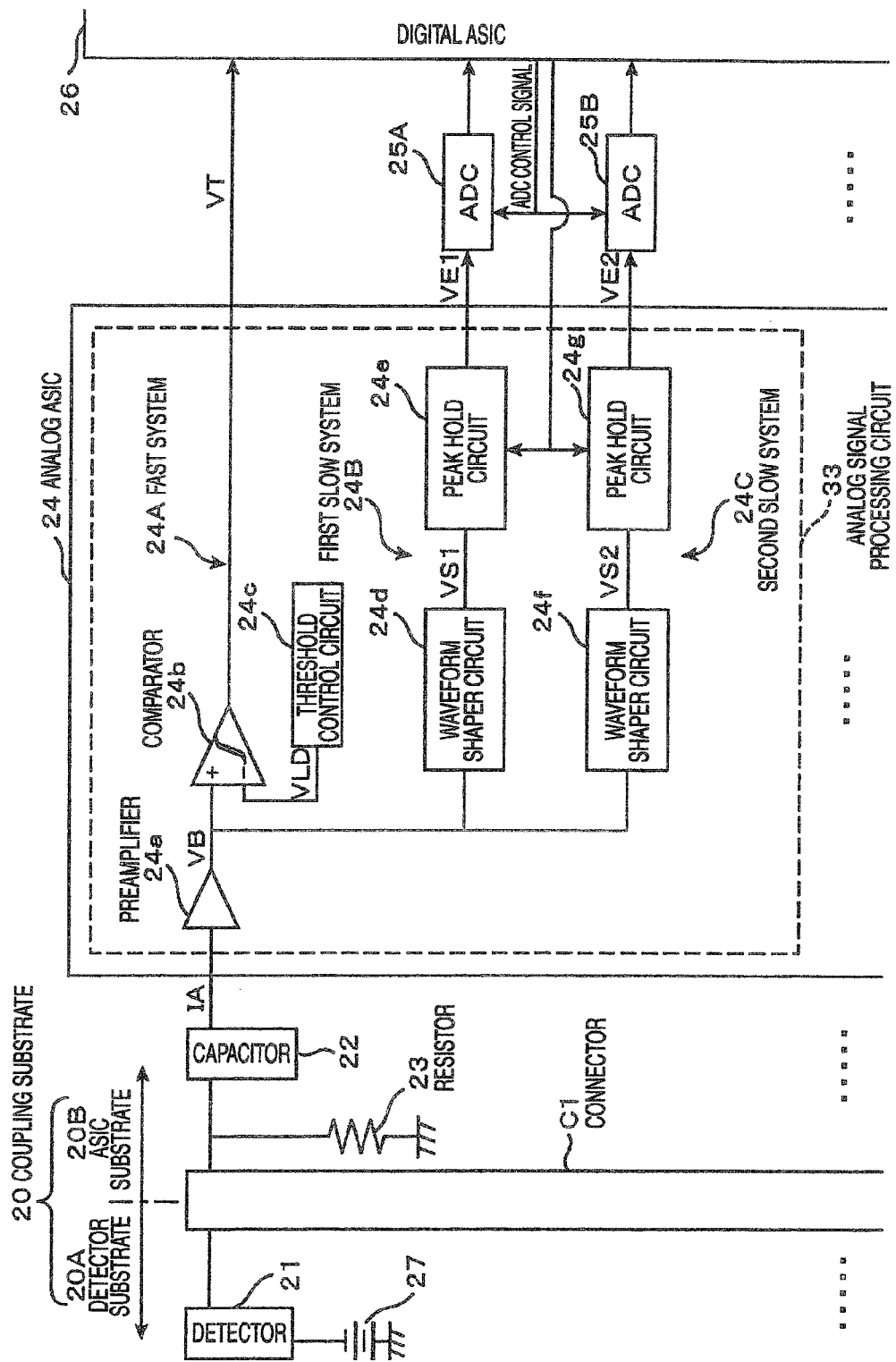
FIG. 8 is a block diagram schematically showing an analog signal processing circuit of the analog ASIC.

FIG. 8 is a block diagram schematically showing the functional configuration of the analog ASIC.

As shown in FIG. 8, one analog ASIC 24 comprises, for example, 32 sets of analog signal processing circuits 33 each includes: a charge sensitive preamplifier (hereinafter, referred to as a preamplifier) 24a; and a fast system 24A and two slow systems (a first slow system 24B, a second slow system 24C) connected to the charge sensitive preamplifier. One analog ASIC 24 is an LSI integrating 32 sets of analog signal processing circuits 33.

The analog signal processing circuit 33 is provided for each detector 21, and one analog signal processing circuit 33 is connected to one detector 21. Here, the fast system 24A comprises: a comparator 24b that outputs a timing signal VT for identifying a detection time of a γ-ray based on a γ-ray detection signal VB outputted from the preamplifier 24a; and a threshold control circuit 24c that sets a threshold voltage value VLD inputted to the comparator 24b. Moreover, in the first slow system 24B, for the purpose of calculating a detection energy (pulseheight value) VE1 of a γ-ray based on the γ-ray detection signal VB, a waveform shaper circuit 24d with a predetermined time constant and a peak hold circuit 24e are provided and connected in this order. Similarly, in the second slow system 24C, for the purpose of calculating a pulseheight value VE2 of the amount of electron contribution of the detection energy (pulseheight value) VE1 of a γ-ray based on the γ-ray detection signal VB, a waveform shaper circuit 24f with a predetermined time constant shorter than that of the waveform shaper circuit 24d and a peak hold circuit 24g are provided and connected in this order.

Incidentally, since it takes a certain amount of processing time for the slow systems 24B, 24C to calculate the pulseheight values, these are named as "slow". A signal outputted from the detector 21 and passing through the capacitor 22 is amplified by the preamplifier 24a, and is outputted as the γ-ray detection signal VB, and is further amplified by the waveform shaper circuits 24d, 24f, and is inputted to the peak hold circuits 24e, 24g as the signals VS1, VS2, respectively. The peak hold circuit 24e holds a maximum value of the waveform-shaped γ-ray detection signal VS1 as described later, i.e., the pulseheight value VE1 proportional to an energy value of the detected γ-ray. The peak hold circuit 24g holds the pulseheight value VE2 of the waveform-shaped γ-ray detection signal VS2 corresponding to the amount of electron contribution of the γ-ray detection signal VB as described later.

In addition, although the capacitor 22 and resistor 23 may be provided inside the analog ASIC 24, in the present embodiment, in order to obtain an appropriate capacitor value and appropriate resistance value, and for reasons of reducing the size of the analog ASIC 24, the capacitor 22 and resistor 23 are mounted outside the analog ASIC 24.

Incidentally, the variation in the individual capacitor value or resistance value is assumed small if the capacitor 22 and resistor 23 are provided outside the analog ASIC 24.

The output of the first slow system 24B of the analog ASIC 24 is supplied to ADC 25A, and the output of the second slow system 24C is supplied to ADC 25B (see FIG. 8). Furthermore, the output of the fast system 24A of the analog ASIC 24 and the outputs of ADCs 25A, 25B are supplied to the digital ASIC 26.

Here, each of the analog ASICs 24 and the digital ASIC 26 is connected by means of 32 pieces of wirings each transmitting each of the signals of 32 channels of fast systems 24A (see FIG. 7). Moreover, the analog ASIC 24 and each of the ADCs 25A, 25B are connected to each other, and each of the ADCs 25A, 25B and the digital ASIC 26 are connected to each other, respectively, with one piece of wiring that puts together and transmits the signals of the slow systems 24B, 24C of eight channels of detectors 21, (see FIG. 7).

Furthermore, an ADC control signal line for simultaneously controlling a pair of ADCs 25A, 25B that are associated corresponding to eight channels of analog signal processing circuits 33; and a peak hold control signal line obtained by putting eight channels of peak hold control signal lines together into one line, the eight channels of peak hold control signal lines simultaneously controlling the peak hold circuits 24e, 24g of one analog signal processing circuit 33 of each analog ASIC 24, are routed from the digital ASIC 26 and connected to the ADCs 25A, 25B and the analog signal processing circuit 33.

In addition, each of the above-described eight channels of peak hold control signal lines may be routed from the digital ASIC 26 to each analog signal processing circuit 33 without putting them together into one line.

(Digital ASIC)

Next, the digital ASIC 26 is described with reference to FIG. 7 and FIG. 9.

Figure 9:
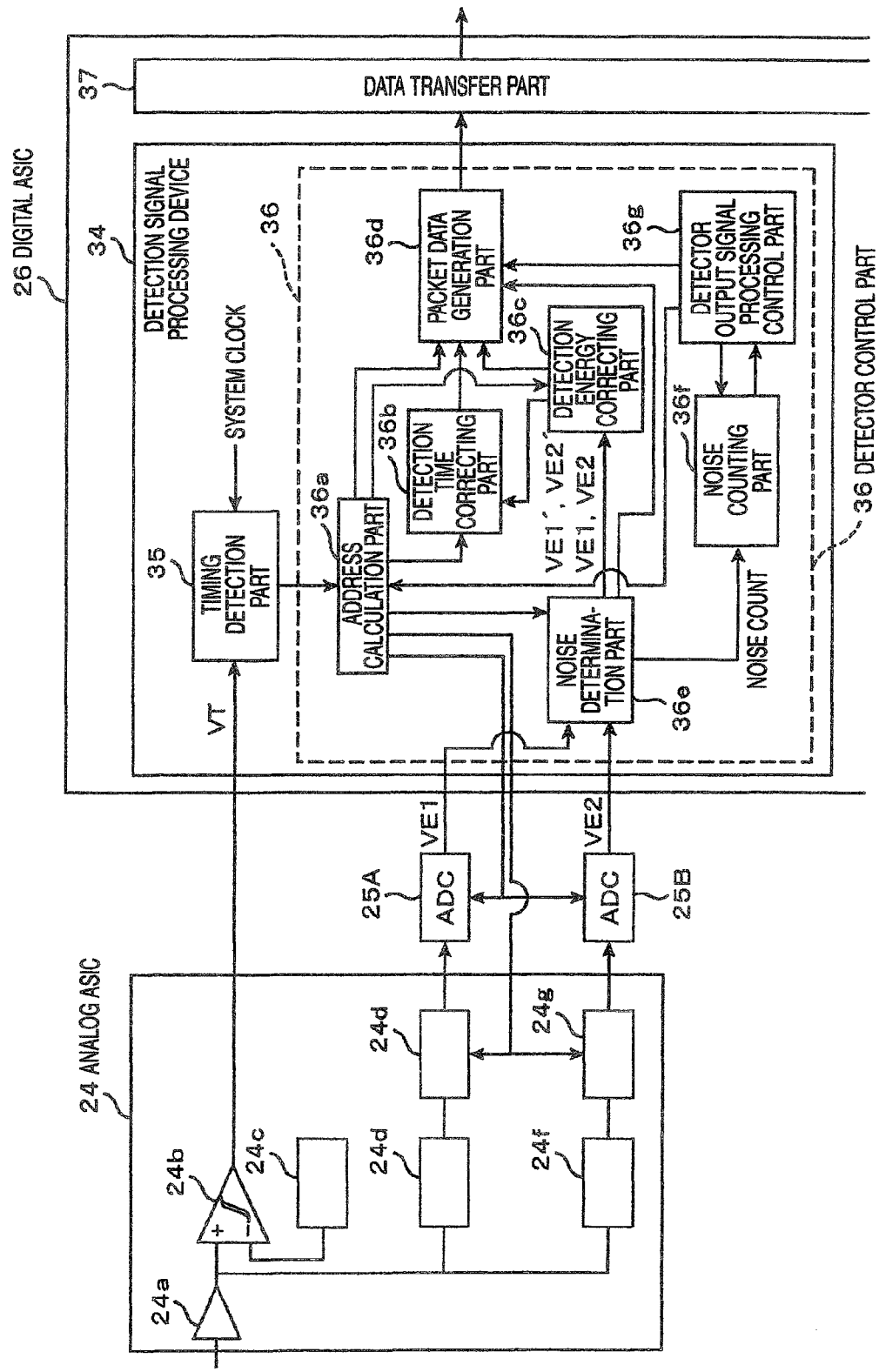
FIG. 9 is a block diagram schematically showing the detection signal processing and the like of the digital ASIC.

FIG. 9 is a block diagram schematically showing the functional configuration of the digital ASIC. As shown in FIG. 7, the digital ASIC 26 comprises 16 sets of detection signal processing parts 34, each including eight timing detection parts 35 and one detector control part 36, and one data transfer part 37. The digital ASIC 26 is an LSI integrating these.

All the digital ASICs 26 provided in the PET apparatus 1 receive a clock signal from a non-illustrated 500 MHz clock generator circuit (crystal oscillator), for example, and operate in a synchronous manner. The clock signal inputted to each of the digital ASICs 26 is inputted to the respective timing detection parts 35 in all the detection signal processing parts 34.

The timing detection part 35 is provided for each detector 21, and the timing signal VT is inputted from the comparator 24b of the corresponding analog signal processing circuit 33 is inputted the timing detection part 35. The timing detection part 35 determines a detection time of a γ-ray based on a clock signal when the timing signal VT is inputted. Because the timing signal VT is based on the signal of the fast system 24A of the analog ASIC 24, a time close to the true detection time can be made a detection time (detection time information).

The detector control part 36 comprises an address calculation part 36a, a detection time correcting part 36b, a detection energy correcting part 36c, a packet data generation part 36d, a noise determination part 36e, a noise counting part 36f, and a detector output signal processing control part 36g (hereinafter, referred to as a control part).

Upon receipt of detection time information on a detected γ-ray corresponding to the timing signal VT from the timing detection part 35, the address calculation part 36a identifies the relevant detector ID and outputs this detector ID to the detection time correcting part 36b, the detection energy correcting part 36c, the packet data generation part 36d, and the noise determination part 36e. In other words, the address calculation part 36a stores the detector ID for each timing detection part 35 connected to the address calculation part 36a in advance, so that when detection time information is inputted from a certain timing detection part 35, the address calculation part 36a can identify a detector ID corresponding to this timing detection part 35. This is possible because the timing detection part 35 is provided for each detector 21.

Furthermore, after receiving the time information, the address calculation part 36a outputs a peak hold control signal to the analog signal processing circuit 33 including the above-described identified detector ID, and also outputs the detector ID and the ADC control signal to ADCs 25A, 25B.

In addition, the address calculation part 36a includes a non-illustrated nonvolatile memory and stores therein a detector ID determined as abnormal, which is described late. If a detector ID identified by the timing signal VT coincides with the detector ID determined as abnormal, the address calculation part 36a will not output the peak hold control signal and the ADC control signal.

The peak hold circuits 24e, 24g of the analog signal processing circuit 33 that received the peak hold control signal will carry out peak hold processing to the signals inputted from the waveform shaper circuits 24d, 24f. Then, upon receipt of a reset signal from the address calculation part 36a after a predetermined time elapsed, the peak hold circuits 24e, 24g cancels the peak hold processing. ADCs 25A, 25B convert the pulseheight values (voltage values) VE1, VE2 outputted from the peak hold circuits 24e, 24g of the analog signal processing circuit 33 corresponding to the detector ID inputted from the address calculation part 36a, into a digital signal and output the same to the noise determination part 36e.

The noise determination part 36e includes a non-illustrated nonvolatile memory and stores therein a correlation data between two pulseheight values VE1, VE2 used for determining whether a relevant detection signal is a noise or not. Thus, the noise determination part 36e determines whether the relevant signal is a noise signal or a γ-ray detection signal based on the inputted pulseheight values VE1, VE2 (the details will be described later). If determined as a γray detection signal, the noise determination part 36e will not output a noise count signal but output the pulseheight values VE1, VE2 to the detection energy correcting part 36c.

The detection energy correcting part 36c includes a non-illustrated nonvolatile memory and stores therein each correction value of the gain and offset of each detector 21 and analog ASIC 24 based on the calibration data collected in advance. Then, using the above-described correction value corresponding to the detector ID inputted from the address calculation part 36a, the detection energy correcting part 36c calculates pulseheight value VE1' and VE2' that are corrected from the pulseheight values VE1, VE2 and outputs the same to the detection time correcting part 36b. Moreover, the detection energy correcting part 36c generates, based on the corrected pulseheight value VE1' and VE2', the information on the detection energy value corresponding to an energy of the detected γ-ray, and outputs the same to the packet data generation part 36d.

If determined as a noise signal, the noise determination part 36e outputs a noise count signal to the noise counting part 36f along with the detector ID, and outputs a reset signal to the packet data generation part 36d but does not output the pulseheight values VE1, VE2 to the detection energy correcting part 36c.

The noise counting part 36f includes a non-illustrated non-volatile memory or volatile memory and counts and stores therein the noise count for each detector ID. If the noise count is equal to or greater than a specified reference value, the noise counting part 36f determines a relevant detector 21 as abnormal and outputs this abnormality determination to the control part 36g. Moreover, the control part 36g includes a non-illustrated nonvolatile memory and stores therein the abnormality determination output from the noise counting part 36g. Based on this, the control part 36g controls data processing in the detector control part 36 with respect to an output signal from the detector 21 corresponding to the detector ID that is determined as abnormal.

The detection time correcting part 36b corrects the detection time information inputted from the address calculation part 36a based on the pulseheight values VE1', VE2' inputted and corrected from the detection energy correcting part 36c, and outputs the same to the packet data generation part 36d.

The packet data generation part 36d appends the corrected detection time information and the detector ID to the information on the detection energy value from the detection energy correcting part 36c, and thereby generates a packet data (information on the detected γ-ray, information on the detected radiation), which is digital information, and outputs the same to the data transfer part 37. The data transfer part 37, for example, periodically transmits the packet data outputted from the packet data generation part 36d of each detection signal processing part 34 to the unit integration FPGA 31 (Field Programmable Gate Array, hereinafter, referred to as FPGA) provided outside the enclosure 30 of the detector unit 2 (see FIG. 15, FIG. 16) that houses twelve coupling substrates 20 therein. FPGA 31 transmits these digital information to the data processing device 12 via information transmission wiring connected to a connector 38.

In addition, the method for correcting detection time information in the detection time correcting part 36b, the method for determining whether a relevant detection signal is a γ-ray detection signal or a noise in the noise determination part 36e, and the detailed operations of the noise counting part 36f and control part 36g will be described later.

(Detector Unit; Unitization by Housing Coupling Substrates)

Next, unitization by housing the above-described coupling substrates 20 into the enclosure 30 is described.

Figure 10:
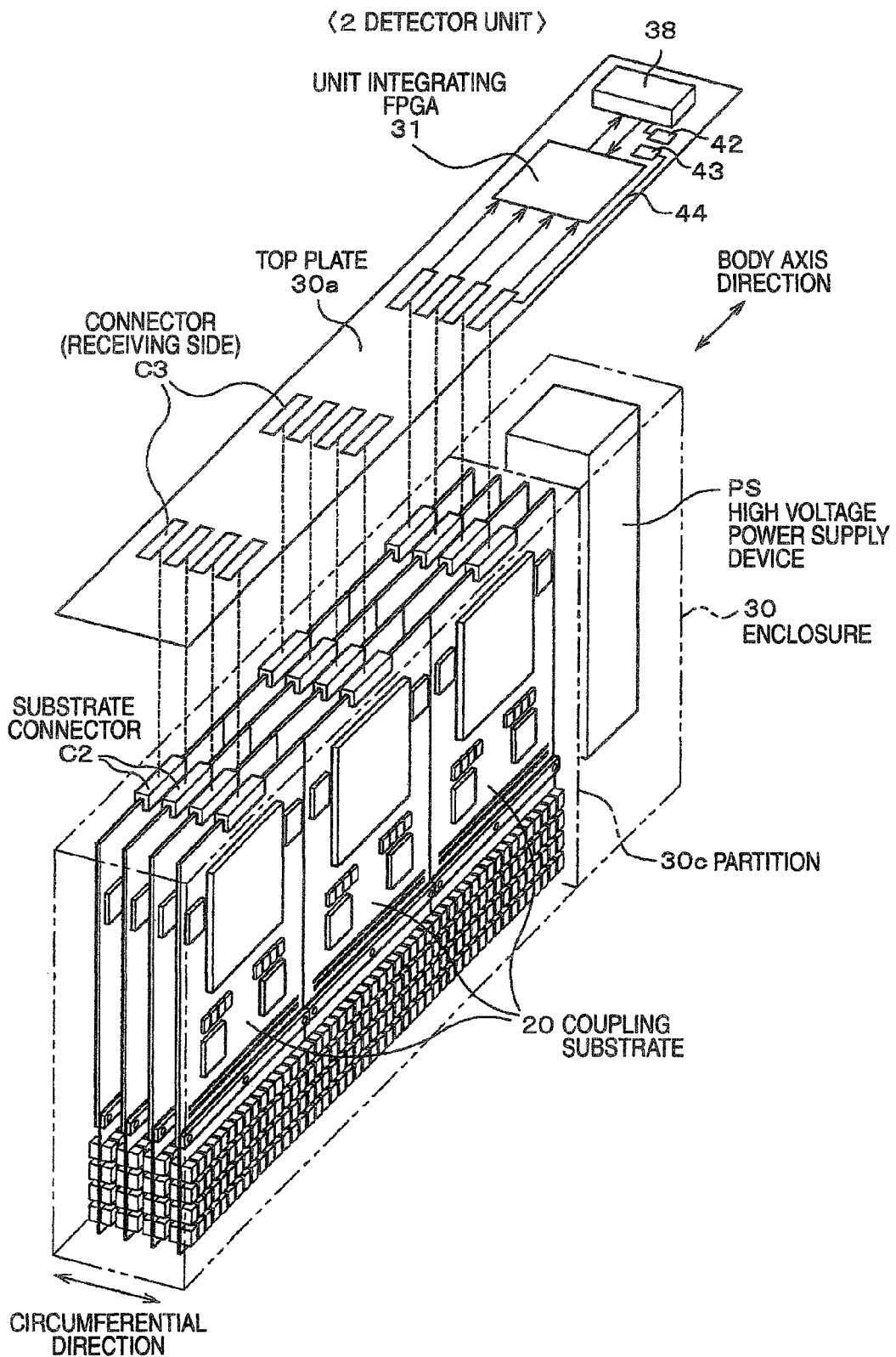
FIG. 10 is a transparent perspective view showing the structure of a detector unit housing a plurality of coupling substrates therein.

As shown in FIG. 10, the detector unit 2 comprises twelve coupling substrates 20, a high voltage power supply device PS that supplies a charge collecting voltage to these twelve coupling substrates 20, FPGA 31, a signal connector that transfers signals to/from the outside, the enclosure 30 (see FIG. 11) that houses or holds a power supply connector and the like for receiving power supply from the outside, and the like.

Figure 11:
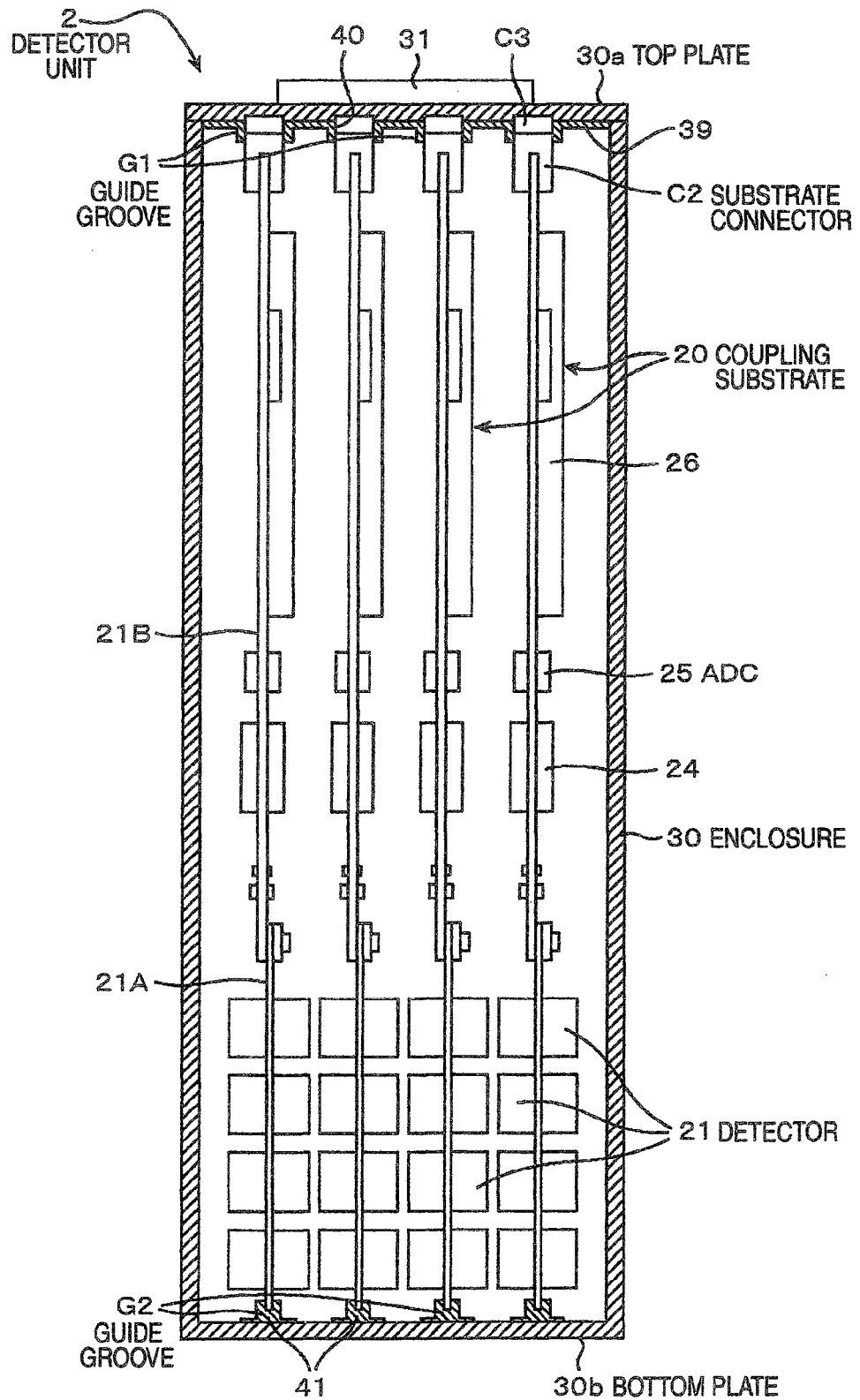
FIG. 11 is a side view looking at the detector unit of FIG. 10 in the body axis direction.

As shown in FIG. 10 and FIG. 11, in the enclosure 30, three rows of coupling substrates 20 are housed so as not to overlap to each other in the depth direction (in the body axis direction of the test object P), while four coupling substrates 20 are housed side by side in the circumferential direction of the camera 11. Namely, twelve coupling substrates 20 are housed in one enclosure 30. In order to house this way, a guide member 39 including four rows of guide grooves G1 suitably spaced apart to each other in the circumferential direction, the guide groove G1 extending in the depth direction, is attached to a top end portion of the enclosure 30. The guide member 39 includes an opening 40 at a position opposite to each connector C3 of a top plate 30a in each guide groove G1 portion.

Furthermore, four guide members 41 each including a guide groove G2 extending in the depth direction are attached to the upper surface of a bottom plate 30b of the enclosure 30, the guide members 41 being suitably spaced apart to each other in the circumferential direction (see FIG. 11). The guide grooves G1, G2 have a depth enough to house three coupling substrates 20. An edge portion on the ASIC substrate 20B side of the coupling substrate 20 is inserted into the guide groove G1, and an edge portion on the detector substrate 20A side of the coupling substrate 20 is inserted into the guide groove G2. Three coupling substrates 20 are to be held side by side in the depth direction of the guide grooves G1, G2.

Incidentally, in the coupling substrate 20, an edge portion on the ASIC substrate 20B side and an edge portion on the detector substrate 20A side are adapted to slide in the guide grooves G1, G2, respectively, so that the coupling substrate 20 can be easily slid in the guide grooves G1, G2 using fingers or the like to position at a predetermined place. At this time, each of the substrate connectors C2 is positioned in the opening 40 portion. After a predetermined number of coupling substrates 20 are disposed in the enclosure 30, the top plate 30a is removably mounted to the top edge of the enclosure 30 with screws or the like. Each connector C3 provided in the top plate 30a is inserted into the corresponding opening 40 and connected to the corresponding substrate connector C2.

In addition, the upper and the lower of the enclosure 30 are referred to the positional relation when the enclosure 30 is removed from the camera 11, and as shown in FIG. 2, when the enclosure 30 is provided in the camera 11, the upper and the lower will be reversed, or the upper and the lower will be rotated by 90° to be at a horizontal position or at a diagonal position.

As shown in FIG. 11, the top plate 30a of the enclosure 30 is provided with the FPGA 31 and the connector 38 (see FIG. 10) in addition to the above-described four rows of guide grooves G1. The connector 38 is connected to the FPGA 31. Programming can be done using FPGA 31 on site. FPGA 31 differs in this point from ASIC with which programming cannot be done. Accordingly, as in the present embodiment, FPGA 31 can appropriately respond to, for example, even the case where the number and type of the coupling substrates 20 to be housed have changed, or also the case where the number of coupling substrates has changed.

In addition, since the detector 21 used in the present embodiment, wherein CdTe is used as the semiconductor material S, will generate charges in response to light, the enclosure 30 is formed of a material having light shielding characteristics, such as aluminum or an aluminium alloy, and is thus adapted to eliminate a gap through which light enters. That is, the enclosure 30 is constructed so as to have light shielding characteristics. Incidentally, if the light shielding characteristics are secured by other means, the enclosure 30 itself does not need to have light shielding characteristics and just needs to be a frame that removably holds the detector 21. For example, the enclosure 30 may be of a frame structure, thus eliminating a need for a light-shielding face plate, and the like.

Moreover, packet data (all the packet data for all the detectors 21 of all the coupling substrates 20) outputted from the data transfer parts 37 of all the coupling substrates 20 in the detecting unit 2 is sent from FPGA 31 provided in the detecting unit 2 to the data processing device 12.

(Power Supply)

Next, the high voltage power supply device PS for supplying a charge collecting voltage is described. As shown in FIG. 10, in the detector unit 2, the high voltage power supply device PS for supplying a charge collecting voltage to each detector 21 is mounted in a space formed by a partition 30c composed of a conductor metal material inside the enclosure 30 on the rear surface side of FPGA 31. This high voltage power supply device PS is supplied with a low voltage power, and is adapted to boost up this voltage to 500 V using a non-illustrated voltage boosting type DC-DC converter, and to supply the same to each detector 21. Incidentally, 64 detectors 21 are provided on one side and 128 detectors 21 are provided on both sides per one detector substrate 20A. Then, twelve coupling substrates 20 are housed in one enclosure 30. Accordingly, the high voltage power supply device PS supplies a voltage to 128×12=1536 detectors 21.

In the present embodiment, the high voltage power supply device PS contained in the detector unit 2 is connected to an external low voltage (5 to 15 V) DC power supply by power wiring via a power connector 42 and connector 38 provided in the top plate 30a. High voltage side terminal pins of the high voltage power supply device PS are connected to twelve connectors C3 provided on the top plate 30a, respectively, via the connector 43 provided on the top plate 30*a*, by means of high voltage power supply wiring 44. In FIG. 10, only one high voltage power supply wiring 44 is shown as to be connected from the connector 43 to the connector C3 by way of illustration, but the high voltage power supply wiring 44 is actually routed from the connector 43 to each connector C3.

The high voltage power supply is connected to the electrode C of each detector 21 provided in the substrate body 20*a*, respectively, via the connector C3, the connector C2 of each coupling substrate 20, the non-illustrated high voltage power supply connector C1 in the substrate body 20*b*, and non-illustrated high voltage power wiring in the substrate body 20*a*. The connectors C1, C2 include a connector used for high voltage power wiring in addition to the connectors for transmitting the output signals of the detector 21.

Incidentally, a voltage supplied from the connector 38 to the high voltage power supply device PS is boosted up to 500 V by a non-illustrated DC-DC converter inside the high voltage power supply device PS, and after the boost up, this is supplied, through the interior of the top plate 30*a* of the enclosure 30, to the ASIC substrate 20B to the detector substrate 20A to each detector 21 for each coupling substrate 20. That is, the enclosure 30 (top plate 30*a*) includes the voltage supply wiring for supplying a voltage from the high voltage power supply device PS to each coupling substrate 20. Moreover, each coupling substrate 20 includes the voltage supply wiring for supplying each detector 21 with a voltage supplied from the high voltage power supply device PS via the substrate connector C2.

In addition, the high voltage power supply device PS may be directly connected to the high voltage power wiring provided in the substrate body 20*a* via a connector, instead of via the top plate 30*a*. Moreover, the high voltage power connector may be disposed separately from the output signal connector of the detector 21.

<<Operational Description of Analog ASIC and Digital ASIC>>

Next, processing to the detector output signal, the processing being a feature of the present invention, will be described with reference to FIG. 12 to FIG. 16.

(Operational Description of Analog ASIC)

Figure 12A:
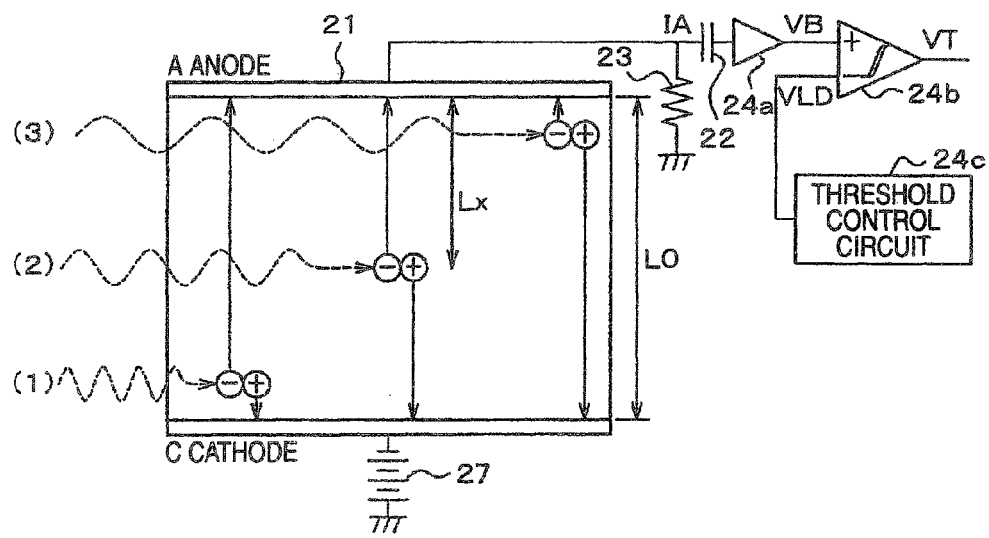
FIG. 12A and FIG. 12B describe that the output timing of a timing signal VT differs depending on positions between an anode and a cathode of a detector that interacts with γ-rays.

FIG. 12A is a view, where the detector 21 is modeled with a single layer, showing a portion where the comparator 24*b* outputs the timing signal VT, which is a voltage signal, based on an output current pulse IA from the detector 21.

Figure 12B:
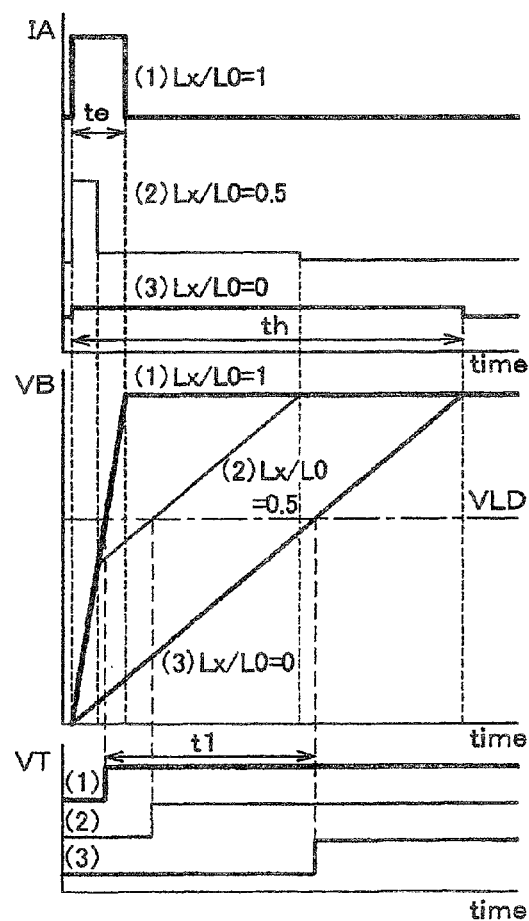

FIG. 12B is a view showing a relation among the waveform of the current pulse IA generated at the input side of the preamplifier 24*a* in FIG. 12A, the voltage signal VB obtained as an output by converting this current pulse IA into a voltage signal in the preamplifier 24*a*, i.e., the waveform of the voltage signal VB appearing at the input side of the comparator 24*b*, and the timing signal VT that is outputted from the comparator 24*b* based on this voltage signal VB with a predetermined voltage VLD being as a threshold.

In the detector 21, the both electrodes of cathode C and anode A are connected to the high voltage power supply 27 and to a resistor 23 via a capacitor 22, respectively, and the anode A on the resistor 23 side is connected to the input side of the preamplifier 24*a*. The output side of the preamplifier 24*a* is connected to an input side (+) of the comparator 24*b*, and the output voltage VLD from a threshold control circuit 24*c* is connected to a reference side (−) of the comparator 24*b*, and if the output voltage VB becomes equal to or greater than the predetermined voltage threshold VLD, the timing signal VT appearing at the output terminal of the comparator 24 is inverted.

If a γ-ray is incident upon the detector 21 and absorbed, an electron-hole pair corresponding to the absorbed γ-ray energy will be generated, and the electron and hole are induced by an electric field applied by the high voltage power supply 27, and thereby the electron will transfer to the anode A side and the hole will transfer to the cathode C side. This transfer of the electron and the hole results in the current pulse IA occurring at the input side of the preamplifier 24*a*. Since the detector 21 has a finite size, the output signal waveform of the current pulse IA varies depending on a position where a γ-ray is absorbed. This is because if a γ-ray is incident upon the vicinity of the cathode C of the detector 21, the ratio for the generated electrons to contribute to the current pulse IA (hereinafter, referred to as a "contribution of electron") is large and on the contrary if the generated electrons are absorbed in the vicinity of the anode A, the ratio for the generated electrons to contribute to the current pulse IA is small. Since the mobility (transfer speed) of an electron is typically 10 times or more the mobility of a hole, the waveform (output signal waveform) of the current pulse IA outputted by the detector 21 will vary depending on the position where the electrons and holes are absorbed in the detector 21. If the distance between the anode A and cathode C is denoted by L0 and the distance between the anode A and a place where an electron-hole pair is generated is denoted by Lx, then in the case of Lx/L0=1, the detector 21 detects an energy approximately equal to the current resulting from the transfer of electron. Moreover, in the case of Lx/L0=0.5, the electron and the hole each half contribute to the current. Moreover, in the case of Lx/L0=0, the generated current will substantially depends on the transfer of hole.

If the absorption of a γ-ray occurs in the vicinity of the cathode C of the detector 21, then the voltage signal VB will be of a signal waveform with the contribution of electron approximately equal to one (100%), thus resulting in the earliest timing detection. Moreover, if the absorption of a γ-ray occurs between the anode A and cathode C to cause the contribution of electron equal to 0.5 (50%), the comparator 24*b* will output the voltage signal VB rising at a timing later than the former. Moreover, if the absorption of a γ-ray occurs in the vicinity of the anode A, the voltage signal VB will be of a signal waveform with the contribution of electron approximately equal to 0 (0%), thus resulting in the latest timing detection. Depending on the configuration of the detector 21 or on the value of a voltage applied to the detector 21, generally, when the detector 21 is used in the PET device 1, the transfer time of the electron (te) in the detector 21 ranges from 20 ns (nanosecond) to 50 ns and the transfer time of the hole (th) in the detector 21 approximately ranges from 200 ns to 500 ns. In this case, depending on the voltage threshold VLD to be compared with, the time difference between the earliest timing detection and the latest timing detection approximately ranges from 200 ns to 300 ns, thus causing a big problem in the simultaneous measurement using the semiconductor radiation detector 21.

FIG. 13A is a view showing the scattering and absorption of radiation in the detector 21, and specifically shows an energy absorption spectrum when the scattering occurs. The horizontal axis represents the detection energy of γ-rays and the vertical axis represents the frequency of occurrence. The detector 21 does not necessarily absorb all the energy of the detected γ-ray. The detector 21 is known to stochastically cause absorption or scattering statistically depending on the quality of the material of elements, shape, and the energy of γ-rays. Since the pulseheight value (voltage value) VE1 which the peak hold circuit 24*e* outputs based on a signal outputted by the detector 21 is proportional to the γ-ray energy absorbed by the detector 21, this pulseheight value VE1 is assumed here to represent the detected energy of the γ-ray. If the detected energy VE1 exceeds a certain value, the frequency of occurrence of absorption will reach a peak at the certain value (here, 511 keV). At this time, the rate of occurrence of scattering is minimal.

FIG. 13B is a view showing a state where the scattering and absorption of a γ-ray occur in the detector 21, FIG. 13C is a view showing a relation among the waveform of the current pulse IA occurring at the input side of the preamplifier 24a in FIG. 13B, the voltage signal VB obtained as an output by converting this current pulse IA into a voltage signal in the preamplifier 24a, and the timing signal VT outputted from the comparator 24b based on this voltage signal VB.

When a γ-ray enters the detector 21, the detector 21 generates an electron-hole pair corresponding to an absorbed energy, and the electron and hole are induced by an electric field generated by an applied voltage, and thereby the electron will transfer to the anode A side and the hole will transfer to the cathode C side. This transfer of the electron and the hole results in the current pulse IA occurring at the input side of the preamplifier 24a. The example here shows the case where the energy of the incident radiation is 511 keV, wherein all the energy is absorbed (on the left in the view) and the half the energy is absorbed and the remaining half energy is scattered (on the right in the view), at the same position between the anode A and the cathode C. About the current pulse IA of FIG. 13C, in either case, it takes the same time te for the generated electron and hole to transfer to the anode A and the cathode C, respectively, however, in the latter case the detector 21 outputs the current half the former case.

For example, the waveform of the voltage signal VB at the contribution of electron of 100% is described. When the detected energy changes, for example, when one energy is 511 keV and the other energy is 255 keV, the number of electrons occurring in the vicinity of the cathode C inside the detector 21 changes, and the both cases show no difference in the time interval (transfer time of the electron) te of the current pulse IA but shows a difference in the current value (pulse height), so that in the waveform of the voltage signal VB at the input side of the comparator 24b, the energy of 255 keV shows a smaller gradient than the energy of 511 keV. Accordingly, when compared with a specified voltage threshold VLD in the comparator 24b, the energy of 255 keV delays by a time t2 as compared with the energy of 511 keV.

Returning to FIG. 8, the time constant of the waveform shaper circuit 24d is set to 1000 ns, and the time constant of the waveform shaper circuit 24f to 50 ns, for example. The electron-hole pair occurring in the detector 21 is converted into the voltage signal VB by the preamplifier 24a, and thereafter the comparator 24 outputs the timing signal VT obtained by discriminating the voltage signal VB with the predetermined voltage threshold VLD. The voltage signal VB is also subjected to noise elimination processing and waveform shaping through the waveform shaper circuit 24d to be converted into a voltage signal VS1 corresponding to an energy E1 of the detected γ-ray, and then the peak hold circuit 24e outputs a pulseheight value VE1 of the voltage signal VS1. The voltage signal VB is converted into a voltage signal VS2 corresponding to an energy E2 of the detected γ-ray, the energy E2 being contributed by only the transfer of the electron filtered through the waveform shaping circuit 24f with a time constant 50 ns corresponding to the mobility of the electron of an electron-hole pair. Then, the peak hold circuit 24g outputs a pulseheight value VE2 of the voltage signal VS2.

FIG. 14 is a view showing the transient response waveforms of the respective output signals VB, VT, VS1, VE1, VS2, and VE2 in FIG. 8. When the voltage signal VB reaches or exceeds the voltage threshold VLD, the timing signal VT changes from the low level to the high level, and the peak hold circuit 24e and the peak hold circuit 24g will hold the pulseheight values of the respective outputs VS1 and VS2 of the waveform shaper circuit 24d and the waveform shaper circuit 24f. The above-described time constant 1000 ns of the waveform shaper circuit 24d is set to a time constant longer than the transfer time of the hole inside the detector 21 to broaden the pass band, thereby allowing for the passage of a total of the γ-ray detection signals VB of the amount of electron contribution, the amount of hole contribution, and both signal components. On the other hand, the above-described filter time constant 50 nsec of the waveform shaper circuit 24f is set to be equivalent to the transfer time of the electron inside the detector 21 to narrow the pass band, thereby preventing the passage of the signal components other than the amount of electron contribution of the γ-ray detection signals VB as much as possible. This configuration makes it possible to acquire information on the detected energy and the contribution of electron.

(Operation of Noise Determination Part)

As described above, the voltage signal VB that is outputted from the preamplifier 24a when the detector 21 detects a γ-ray depends on the position of the cathode C and the anode A and has a time-varying distribution specific to γ-ray detection signals. For this reason, there is a correlation between the respective pulseheight value VE1 and pulseheight value VE2 of the output signals outputted from the waveform shaper circuit 24e with a time constant 1000 ns and the waveform shaper circuit 24g with a time constant 50 ns, wherein the correlation corresponds to one point in the regions 81 to 83 in FIG. 15 depending on the detection energy and the position between the anode A and the cathode C where the absorption occurs inside the detector 21.

FIG. 15 is a view showing a correlation between the pulseheight value VE1 and the pulseheight value VE2, wherein the pulseheight value VE2 of the amount of electron contribution is plotted in the horizontal axis and the pulseheight value VE1 including both contributions of electron and hole is plotted in the vertical axis. In FIG. 15, the region 81 is a region where the amount of electron contribution is dominant, the region 83 is a region where the amount of hole contribution is high, and the region 82 is a region where a part of the contribution of hole is added to the contribution of electron.

Then, the region 80 is a region of noise signals. The noise signal does not necessarily have a δ function-like spike waveform, but may have a broad waveform in time scale.

The noise determination part 36e includes a non-illustrated nonvolatile memory and stores therein a correlation table data having the pulseheight values VE1, VE2 as shown in FIG. 16 as parameters in advance. Based on the correlation table data stored in the above-described nonvolatile memory, the noise determination part 36e carries out determination processing to determine a relevant detection signal as a noise signal if the inputted pulseheight values VE1, VE2 correspond to the region 80.

In addition, in place of the table data indicative of the correlation shown in FIG. 16, an equation expressing a gradient of the boundary between the regions of FIG. 15 may be stored in the above-described nonvolatile memory, but the boundary between the region 80 and a region putting together the regions 81, 82 and 83, is not a straight line, so a table lookup type is better in order to accurately make a noise determination.

When the noise determination part 36e, based on the inputted pulseheight values (voltage values) VE1, VE2, determines that the γ-ray detection signal VS1 is a γ-ray detection signal resulting from the intended γ-ray detection, i.e., that the γ-ray detection signal VS1 is not a noise signal, the noise determination part 36e will not output a noise count signal but output two pulseheight values VE1, VE2 to the detection time correcting part 36b and output the pulseheight value VE1 to the packet data generation part 36d. When the noise determination part 36e determines that the γ-ray detection signal VS1 is a noise signal, the noise determination part 36e will output a noise count signal to the noise counting part 36f and output a reset signal to the packet data generation part 36d, but will not output the pulseheight values VE1, VE2 to the detection time correcting part 36b and will not output the pulseheight value VE1 to the packet data generation part 36d.

Accordingly, if determined as a noise signal, the detection time correcting part 36b will not carry out the later-described correction of detection time information and the packet data generation part 36d will not output an unnecessary data to the data processing device 12 that carries out simultaneous measurement processing, so that the load of the digital ASIC 26 is reduced and the load of signal processing on the downstream side is also reduced.

(Noise Counting Part)

Moreover, the noise counting part 36f has a nonvolatile memory function to store, for eight channels of detectors 21, the number of times a relevant detection signal is determined as a noise signal. Upon input of a noise count signal from the noise determination part 36e, the noise counting part 36f will, based on the inputted detector ID, increment the noise count number of the relevant detector ID by one count and stores the same. Then, the noise counting part 36f checks if the noise count number exceeds a specified reference value for each one increment, and if the noise count number exceeds the specified reference value that is set in advance, the noise counting part 36f makes "abnormality determination" (determines as faulty) and outputs the detector ID and the abnormality determination to the control part 36g. The noise counting part 36f resets to zero the noise count value for the detector ID determined as abnormal, and then newly starts to count.

Here, the noise counting part 36f may adopt a method of carrying out noise counting for each specified period of time and automatically resetting to zero count after a specified period of time.

(Operation of Detector Output Signal Processing Control Part)

The control part 36g includes a nonvolatile memory function. Upon receipt of the abnormality determination, the control part 36g stores an abnormality determination time based on a system clock and the detector ID, and inputs and stores this detector ID to the address calculation part 36a.

Even if the timing signal VT of a channel of the detector 21 corresponding to the stored detector ID is inputted, the address calculation part 36a will not carry out address calculation processing and will not output the detector ID, thereby preventing the data processing in the detector control part 36. Namely, since the address calculation part 36a will not output an ADC control signal to the abnormal detector 21, the pulseheight value will not be read by ADCs 25A, 25B and the calculation processing using VE1, VE2 will not be carried out.

Moreover, the control part 36g outputs to the packet data generation part 36d the faulty information containing the detector ID and the information on the time when determined as abnormal, and transmits the same to the data processing device 12 to store this into a storage device of the data processing device 12 as a history in which the faulty information is put in chronological order. Thus, an operator can periodically display a distribution of abnormal detectors 21 and chronological changes and inspect the same.

Moreover, concerning the detector ID that has been determined as abnormal, the control part 36g, based on the last abnormality determination time information which the control part 36g itself stores, determines whether or not new abnormality determination information has not been inputted for a predetermined elapsed time period during the operating time of the PET device 1. When the abnormality determination has not been inputted from the noise determination part 36e for the predetermined elapsed time period, the control part 36g will erase the relevant detector ID that has been determined abnormal, the relevant detector ID being previously stored in the address calculation part 36a, from the memory. Moreover, the control part 36g outputs to the packet data generation part 36d the detector ID and the information on the time when the abnormality determination is canceled, and transmits the same to the data processing device 12 to stores this into a storage device of the data processing device 12 as the faulty information.

The detector 21 may temporarily output a noise signal due to dust adhesion, or the like, and then the dust may come off from the detector 21 and the detector 21 may not output the noise signal and return to the normal state. In this case, the control part 36g resets the information on the abnormal detector ID, which was stored in the address calculation part 36a, so that the detector control part 36 subsequently starts to process a γ-ray detection signal of a channel of the relevant detector 21.

In addition, in place of receiving abnormality determination from the noise counting part 36f, the control part 36g may check the noise counting part 36f at a predetermined cycle, and check whether the noise count exceeds a specified reference value, which is set in advance, to make abnormality determination and control the reset of the count of the noise counting part 36f.

Moreover, the method for stopping the signal processing to the detector 21 is not limited to the above-described method. For example, the high voltage power supply 27 individually supplied to the detector 21 may be turned off, or the address calculation part 36a may append an abnormality flag, i.e., identification information indicating to the packet data generation part 36d that the relevant detection signal is faulty, for a packet data of the relevant detector ID, instead of stopping the address calculation. In this case, the data processing part 12 in the subsequent stage detects the abnormality flag contained in the packet data and excludes the relevant packet data so as not to be subjected to the signal processing.

In addition, although the illustration of signal wirings is omitted in FIG. 9, the data, such as the correlation data used in the noise determination part 36e shown in FIG. 15, the reference value used for abnormality determination in the noise counting part 36f, can be checked or exchange using the input operation part 13b of the operator console 13.

(Correction of Detection Time Information)

Next, a method is described, in which time information obtained when the detector 21 detects a γray is corrected with two slow systems 24B, 24C.

From the information on the contribution of electron described above, a correction value for the timing signal VT can be calculated by using a relation at which position of the gap between the cathode C and the anode A in the detector 21 shown in FIG. 12B a γ-ray energy is absorbed.

Since the waveform of VB corresponding to each contribution of electron can be known in advance, it is possible to calculate a time period between a time when VT becomes the high level, i.e., a time when the waveform of VB corresponding to the relevant contribution of electron crosses the horizontal line corresponding to VB=VLD, and a time when an event of detecting a true γ-ray occurs. If the time information, which is the output of the timing detection circuit 35, is corrected using this time period value, the correct time information can be obtained. Moreover, if N pieces of contribution of electron are arbitrarily selected and then a correction value corresponding to each of them is calculated in advance and stored in the detection time correcting part 36b as a table, then the correction value does not need to be calculated each time the voltage signals VE1, VE2 are inputted. This is effective in accelerating the signal processing.

Next, consider the case where the above-described compton scattering has occurred in the detector 21. Even in this case, based on the relation of changes in the timing signal VT due to the detection energy shown in FIG. 13C, the timing signal VT can be properly corrected to obtain the time information.

Since the voltage signal VE1 is proportional to the voltage signal VB, the value of the voltage signal VB can be determined by monitoring the voltage signal VE1. A difference between the voltage signal VB and a voltage value equivalent to the energy inherent in a γ-ray corresponds to the voltage value equivalent to the energy lost due to scattering. Moreover, since the transfer time to of an electron is uniquely determined by the element size of the detector 21 and a voltage applied to the detector 21, the time when the waveform of each voltage signal VB changes from a monotonic increase to a constant state is determined, and the gradient of the monotonically increasing portion between two waveforms can be found. The time t2 can be found as an interval between two points where these waveforms cross the horizontal line corresponding to VB=VLD. If the timing signal VT is corrected using this t2, the correct time information can be acquired. Also in this case, similarly, if N pieces of values of the voltage signal VB are arbitrarily selected and then a correction value corresponding to each of them is calculated in advance and stored into the detection time correcting part 36b as a table, then the correction value does not need to be calculated each time the voltage signal VE1, VE2 are inputted. This is effective in accelerating the PET apparatus 1.

FIG. 16 shows a correction data table having the voltage VE1 and voltage VE2 as parameters. The correction data table in FIG. 16 is a two-dimensional matrix having two-dimensional data as elements, wherein the two-dimensional data comprise correction values based on the information VE2 of the contribution of electron described above and correction values based on the total energy information VE1, i.e., the energy quantity value that decreased due to scattering. Accordingly, if the detection time correcting part 36b includes this correction data table, a variation in the contribution of electron depending on the position of γ-ray energy absorption in the radiation detector 21, a variation in the detected energy due to scattering of radiation in the detector 21, and a deviation from a true value of the timing signal due to the both variations can be corrected at once, which is effective in accelerating the PET apparatus 1.

(Effect of Data Processing Device)

Thus, a packet data containing (1) information on the detection energy value, (2) detection time information, and (3) detector ID, the packet data being outputted from the digital ASIC 26, is transmitted to the data processing device 12 (see FIG. 2) in the subsequent stage via FPGA 31 and the wiring used for information transmission. Based on the packet data transmitted from the digital ASIC 26, the simultaneous measurement device 12A of the data processing device 12 carries out simultaneous measurement processing to count a pair of γ-ray as one piece, the pair of γ-ray having undergone the simultaneous measurement processing, and identifies the positions of two detectors 21, which detected the pair of γ-ray, from their detector IDs. Here, the simultaneous measurement processing is referred to the processing to determine, upon detection of two γ-rays having a specified energy within a time window of a set time, whether or not these γ-rays are a pair of γ-ray occurring due to annihilation of one positron, and leave only the γ-ray pair as a data used for image generation.

When there are three or more γ-ray detection signals detected within the above-described time window (there are three or more detectors 21 that detect the γrays), the data processing device 12 determines which is a series of γ-ray detection signals due to the compton scattering involved in the incidence of one γ-ray of 511 keV among these three or more γ-ray detection signals by using the information on the detection energy value, or the like of these γ-ray detection signals, and identifies a detector ID, upon which the γ-ray at this time entered first, and further determines whether the γ-rays are a pair of γ-ray of 511 keV, and subsequently carries out the simultaneous measurement processing.

The identified pair of detectors 21 are simultaneously measured to generate one count. Moreover, the tomogram information preparation device 12B of the data processing device 12 prepares an accumulation position of radiopharmaceutical, i.e., tomogram information on the test object P at a malignant tumor position, by using the count value obtained in the simultaneous measurement and the positional information on the detectors 21. This tomogram information is displayed on the display device 13a. The information, such as the above-described digital information, the count value and the positional information on the detectors 21 obtained in the simultaneous measurement, the tomogram information, is stored in a storage device of the data processing device 12.

Effects of First Embodiment

The phenomenon that the detection time delays when the position, where the energy of a γ-ray is absorbed, and the contribution of electron inside the detector 21 change as described using FIG. 12A and FIG. 12B, can be uniquely determined if the detected γ-ray energy and the contribution of electron are determined. The same applies to the case where the radiation scatters as described using FIG. 13A to FIG. 13C.

Thus, according to the present embodiment, the timing signal VT can be corrected by transmitting to the detector control part 36 the information, such as the detection timing VT, the detected γ-ray energy (pulseheight value) VE1, and the pulseheight value VE2 of the amount of electron contribution of the detected γ-ray energy. Distributions of timing detection times differ as follows. Before the correction, the distribution corresponding to low contribution ratios of electron mobility spreads widely to the later time side, while after the correction, observational data samples gather near the true detection time. This increases the probability of assuming true coincidental events to be the equal time, and thus effective events in the observational data will increase. As a result, this makes it possible to suppress a loss of effective data, which is the greatest disadvantage of the PET device 1 using the semiconductor radiation detector 21, and to acquire a high contrast and high resolution image in an image pickup time equivalent to that of the conventional PET apparatus using a scintillator.

Moreover, the present embodiment can reduce the effect of timing variations due to noise. The noise is generated from the detector 21 or the preamplifier 24a, in particular. Because in the conventional technique disclosed in JP-A-2002-243858, the output of a preamplifier is supplied to a comparator via a current control part, the waveform gradient of a γ-ray detection signal VB is made gentle, thus degrading the ratio (S/N) of signal intensity to noise intensity. In the present embodiment, there is no path to output the timing signal VT, i.e., no block such as the current control part having characteristic similar to that of a filter causing S/N degradation in the fast system 24A. It is therefore possible to carry out comparator operations in an excellent S/N condition and suppress variations in the timing signal VT due to noise.

Here, because both the pulseheight value VE1 corresponding to a detected γ-ray energy and the pulseheight value VE2 of the amount of electron contribution are signals outputted via the filter, they are subjected to process variations. However, because these types of variations are simply caused by element variations inherent in the circuit elements constituting the filter, not caused by noise, calibration can correct the process variations for each input signal.

Moreover, the present embodiment can shorten the image pickup time in the PET apparatus 1. Because the conventional technique disclosed in the above-described JP-A-2002-243858 always forcibly adjusts the slew rate of a high-speed timing signal to that of a low-speed timing signal, time variations due to noise in the comparator to detect timings or due to circuit offsets may tend to be significant even when a lot of events with a high contribution of electron occur. In contrast, the present embodiment determines a correction value for the timing signal VT using the pulseheight value VE2 for observing the contribution of electron, so timing can be detected using a faster rising waveform for a γ-ray detection signal with a high contribution of electron. Accordingly, on average, the present embodiment decreases variations in timing detection and thereby provides more effective counts than the above-described conventional technique, thus allowing the image pickup time in the PET apparatus 1 to be shortened.

Moreover, the present embodiment can improve the diagnostic image contrast. Increasing time variations also increases chances of an error that leads to assume two signals to occur at the same time though they correspond to asynchronously occurring events of radiation incidence. Accordingly, the conventional technique disclosed in JP-A-2002-243858 may degrade the diagnostic image contrast due to incorrect detection. In contrast, the present embodiment enables image pickup to acquire more effective counts as described above and thus can improve the tomographic image contrast.

Moreover, according to the present embodiment, in the noise determination part 36e, the pulseheight value VE1 and the pulseheight value VE2 are compared with the correlation table data for each output signal of the preamplifier 24a to thereby determine whether the relevant detection signal is an intended γ-ray detection signal or a noise. If determined as a noise in the noise determination part 36e, a detection time correction processing to the relevant signal and generating a packet data and sending this packet data to the data processing device 12 are not allowed to be carried out. Accordingly, the signal-processing load of the digital ASIC 26 and FPGA 31 in the PET apparatus 1 with a high counting rate can be reduced.

Especially, in the PET apparatus 1, such that a plurality of γ-ray detection signals are determined as which are caused by the intended incident γ-ray of 511 keV, and are used for PET image generation, when an incident γ-ray generates the plurality of γ-ray detection signals across a plurality of detectors 21, i.e., also when there is scattering, the threshold for a detected γ-ray energy value in the data processing device 12 needs to be set lower to carry out signal processing that takes into account the scattering. In this case, noise is more likely to be regarded as a γ-ray detection signal and be a target of the signal processing. However, the present embodiment makes it possible to efficiently determine and select a γ-ray detection signal with a low energy due to the scattering and a noise and reduce the load of signal processing of the data processing device 12 and prevent degradation of image quality. The present embodiment makes it also possible to find, at an early stage, the address of a abnormal detector 21, which can not distinguish a γ-ray detection signal of a low energy from a noise, and then automatically exclude the same.

Then, in this noise determination, an additional specific analog ASIC 24 circuit is not required and the output signals of the slow systems 24B, 24C for making the γ-ray detection time more accurate just need to be used. This is advantageous in terms of cost of the signal processing device.

In particular, in the conventional technique described in JP-A-2006-98411, an abnormality is determined based on a ratio of the counting rates between detectors that are disposed in multilayer in the radial direction, while the abnormality determination in the present embodiment can be carried out based on an output signal from one detector 21. Accordingly, in the case where the radiation detectors are not disposed in multilayer in the radial direction as described later, the present embodiment can be applied also to a PET apparatus using a scintillator and a photomultiplier.

Moreover, also when there is a channel of the detector 21 that frequently outputs a noise, the noise counting part 36f detects the channel of the detector 21 outputting more noise count signals than a specified reference value, and outputs the abnormality determination to the control part 36g, whereby the control part 36g prevents the address calculation part 36a from carrying out address calculation to the output signal from the relevant detector 21 or from controlling ADC 25A, 25B. Thus, the signal processing load of the digital ASIC 26 and FPGA 31 can be reduced.

In this way, a noise signal can be prevented from being outputted to the data processing device 12 as a packet data from the digital ASIC 26 for image generation, so that PET images with an excellent image quality can be generated.

Moreover, the control part 36g checks the noise count status at a predetermined cycle with respect to the detector 21 that has been determined as abnormal, and if the frequency of occurrence of the noise count satisfies a specified reference value, the detector 21 is recovered for PET image generation thus enabling automatic recover also from a temporary detector abnormality.

Furthermore, the control part 36g outputs to the operator console 13 the date-time information obtained when determined as abnormal and the detector ID for the detector 21 that is determined as abnormal. Accordingly, by viewing this information on the operator console 13 side during maintenance, an operator can determine a need for inspection of the detector unit 2 and monitor a distribution of abnormal detectors among the whole detectors 21.

In addition, since the correlation data stored in the noise determination part 36e and the reference value data for the abnormality determination used by the noise counting part 36f can be changed from the operator console 13, reconfiguration, which flexibly responds to a change with time of the output signal of the detector 21 and a change in the waveform of an output signal due to changes in the installation environment of the PET apparatus 1, or the like, can be carried out.

In addition, in the present embodiment, if the noise counting part 36f determines a detector as abnormal, the control part 36g carries out control to prevent the detector control part 36 from processing the relevant signal thereafter, but not limited thereto. For example, in processing a detected γ-ray energy value for the relevant detector 21, for the detection γ-ray signals that have not being determined as a noise, the control can be carried out so as to process only those corresponding to an energy window obtained by providing a specified energy to 511 keV of an incident γ-ray energy.

Second Embodiment

Next, a nuclear medical diagnosis apparatus, which is another embodiment concerning the present invention, will be described with reference to FIG. 17 to FIG. 20. The nuclear medical diagnosis apparatus of the present embodiment is a SPECT apparatus.

The same configuration as that of the first embodiment is given the same reference numeral to omit the duplicated description.

Figure 18:
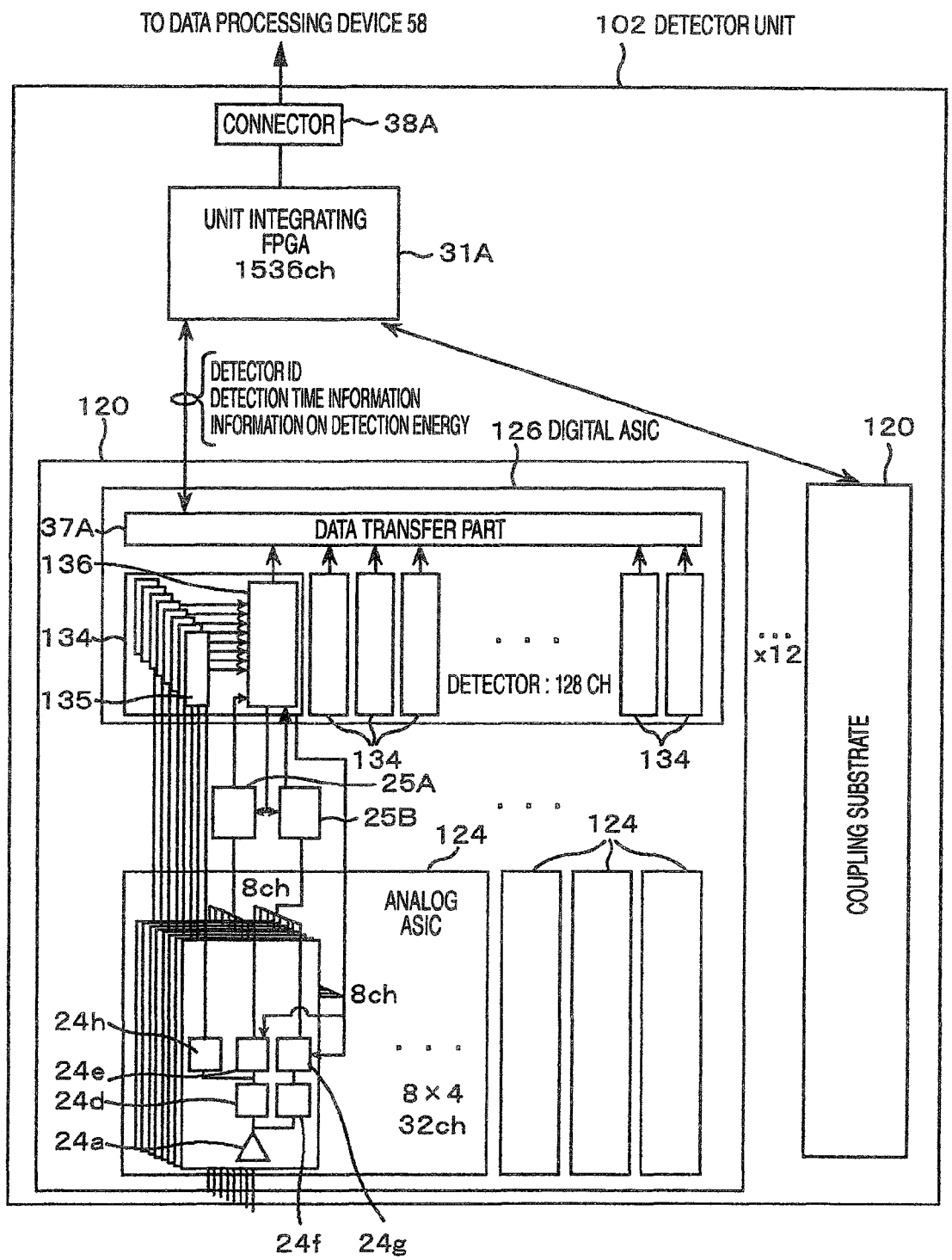
FIG. 18 is a block diagram showing a schematic configuration of a digital ASIC in the SPECT apparatus of FIG. 17, and a connection relation between an analog ASIC and the digital ASIC.
Figure 19:
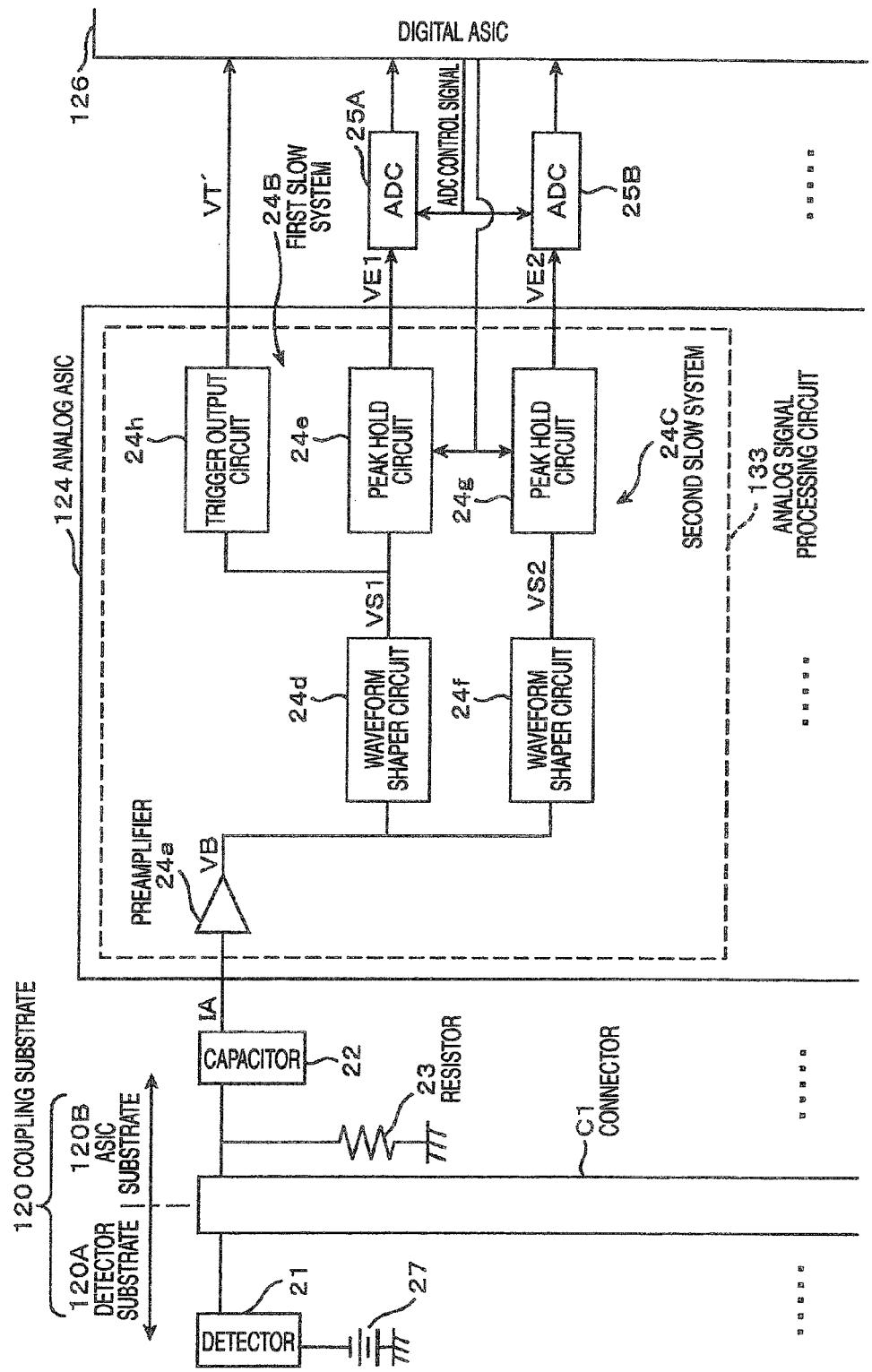
FIG. 19 is a block diagram schematically showing a circuit configuration of the analog ASIC in the SPECT apparatus of FIG. 17.
Figure 20:
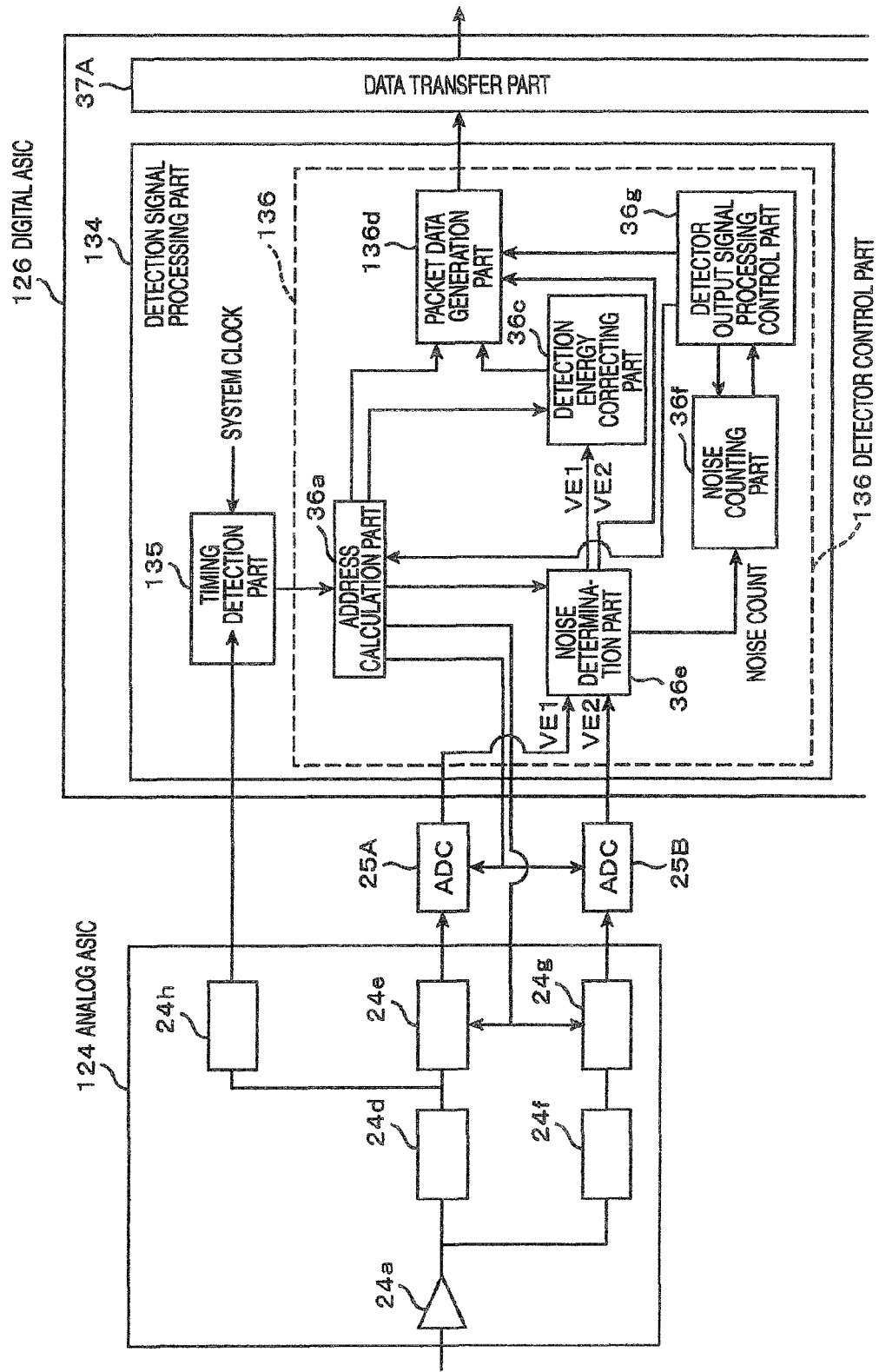
FIG. 20 is a block diagram schematically showing a circuit configuration of the digital ASIC in the SPECT apparatus of FIG. 17.

FIG. 17 is a perspective view showing the configuration of a SPECT apparatus, and FIG. 18 is a block diagram showing a connection relation between an analog ASIC and a digital ASIC in the SPECT apparatus. FIG. 19 is a functional block diagram of the analog ASIC, and FIG. 20 is a functional block diagram of the digital ASIC.

A SPECT apparatus 51 comprises a pair of radiation camera parts 52, a rotating support stand 57, a data processing device 58, and an operator console 13A. The radiation camera parts 52 are disposed facing to each other on the rotating support stand 57 at positions shifted by 180° in the circumferential direction. Specifically, each unit supporting member 56 of the respective radiation camera parts 52 is mounted to the rotating support stand 57 at a position separated by 180° in the circumferential direction. A plurality of detector units 102 each including twelve coupling substrates are removably mounted to the respective unit supporting members 56.

The detector 21 is held in the detector unit 102. The configuration of the respective detector units 102 is the same as the configuration of the detector unit 2 in the first embodiment except the configuration of a coupling substrate 120.

The coupling substrate 120 includes a detector substrate 120A and an ASIC substrate 120B as in the coupling substrate 20 of the first embodiment (see FIG. 19). The detector 21 positioned at a tip portion of each detector substrate 120A is positioned on the bed 14 side. A collimator 55 formed of a radiation shielding material, e.g., lead, tungsten, or the like, is provided on the test object P side of the respective radiation camera parts 52. Each collimator 55 forms a large number of radiation paths through which γ-rays pass. These radiation paths are provided one-to-one corresponding to each detector 21 positioned at the tip portion of each detector substrate 120A of one radiation camera part 52. The coupling substrate 120 and the collimator 55 are disposed inside a light shield/electromagnetic shield 54 disposed in the rotating support stand 57. The collimator 55 is mounted to the light shield/electromagnetic shield 54. The light shield/electromagnetic shield 54 blocks influence on the detector 21 and the like from electromagnetic waves other than γ-rays.

The bed 14, on which the test object P dosed with radiopharmaceutical lies, is moved, and the test object P is moved between a pair of radiation camera parts 52. As the rotating support stand 56 is rotated, each radiation camera part 52 pivots around the test object P. A γ-ray emitted from an accumulation part inside the test object P, where the radiopharmaceutical gathers, e.g., an affected part, is incident upon the corresponding detector 21 through a radiation path of the collimator 55. When the γ-ray interacts with the detector 21, the detector 21 will output a γ-ray detection signal. This γ-ray detection signal is processed by the later-described analog ASIC 124 and digital ASIC 126.

Because the configuration of the detector substrate 120A used in the present embodiment is the same as the configuration in the first embodiment, the description in the present embodiment is omitted. The ASIC substrate 120B constituting the coupling substrate 120 will be described with reference to FIG. 18 to FIG. 20.

The ASIC substrate 120B is connected to the detector substrate 120A via the connector C1 as in the coupling substrate 20 in the first embodiment. The ASIC substrate 120B includes the capacitor 22 and resistor 23, four analog ASICs 124, and one digital ASIC 126 provided for each detector 21.

The analog ASIC 124 comprises the preamplifier 24a, the first slow system 24B, the second slow system 24C, and 32 sets of analog signal processing circuits 133 having a trigger output circuit 24h. The analog signal processing circuit 133 is provided for each detector 21.

Here, since the SPECT apparatus 51 does not carry out simultaneous measurement of a γ-ray pair, a fast γ-ray detection trigger signal is not required. Accordingly, the output signal VS1 of the waveform shaper circuit 24d of the first slow system 24B is used to input the output signal VS1 to the trigger output circuit 24h. In order to remove influence of noise, the trigger output circuit 24h outputs a trigger signal VT' upon input of the γ-ray detection signal VS1 equal to or greater than a setting level.

The digital ASIC 126 includes 16 sets of detection signal processing parts 134 and one data transfer part 37A, wherein each detection signal processing part 134 includes eight timing detection parts 135 and one detector control part 136. The digital ASIC 126 is an LSI integrating these. All the digital ASIC 126 provided in the SPECT apparatus 51 receive a clock signal from a non-illustrated 64 MHz clock generator (quartz oscillator) to operate in a synchronous manner. The clock signal inputted to each digital ASIC 126 is inputted to the respective timing detection part 135 and detector control part 136 inside all the detection signal processing parts 134.

The timing detection part 135 is provided for each detector 21, and the timing signal VT' is inputted from the trigger output circuit 24h of the corresponding analog signal processing circuit 133. The timing detection part 135 determines a detection time of a γ-ray based on the clock signal when the timing signal VT' is inputted, and generates detection time information.

The detector control part 136 includes the address calculation part 36a, the detection energy correcting part 36c, a packet data generation part 136d, the noise determination part 36e, the noise counting part 36f, and the control part 36g.

Upon receipt of the detection time information corresponding to the timing signal VT' obtained when a γ-ray is detected, from the timing detection part 135, the address calculation part 36a identifies a relevant detector ID, and outputs the detector ID and the detection time information to the detection energy correcting part 36c, the packet data generation part 136d, and the noise determination part 36e. That is, the address calculation part 36a stores the detector ID corresponding to each timing detection part 135 connected to the address calculation part 36a, whereby when the detection time information is inputted from a certain timing detection part 135, the address calculation part 36a can identify an detector ID corresponding to the timing detection part 135. This is possible because the timing detection part 135 is provided for each detector 21.

Furthermore, after the trigger signal is inputted the address calculation part 36a, the address calculation part 36a outputs a peak hold control signal to the analog signal processing circuit 133 including the above-described identified detector ID, and also outputs the detector ID and the ADC control signal to ADCs 25A, 25B. Upon receipt of the peak hold control signal, the peak hold circuits 24e, 24g of the analog signal processing circuit 133 carry out peak hold processing to the signal inputted from the waveform shaper circuits 24d, 24f. Then, upon receipt of a reset signal from the address calculation part 36a after a predetermined time, the peak hold circuits 24e, 24g cancel the peak hold processing. The ADCs 25A, 25B convert the pulseheight values (voltage values) VE1, VE2 outputted from the peak hold circuits 24e, 24g of the analog signal processing circuit 133 corresponding to the detector ID inputted from the address calculation part 36a into a digital signal and output the same to the noise determination part 36e. These pulseheight values VE1, VE2 are inputted to the noise determination part 36e.

The noise determination part 36e determines whether the relevant detection signal is a noise signal or a γ-ray detection signal based on the correlation between two pulseheight values VE1, VE2. If determined as a γ-ray detection signal, the noise determination part 36e will output the pulseheight values VE1, VE2 to the detection energy correcting part 36c but will not output a noise count signal to the noise counting part 36f.

By using a correction value corresponding to the gains and offsets of the detector 21 and analog ASIC 124 corresponding to the detector ID inputted from the address calculation part 36a, the detection energy correcting part 36c calculates pulseheight values VE1', VE2' that are corrected from the pulseheight values VE1, VE2, and generates information on the detection energy value corresponding to the energy of the detection γ-ray, and outputs the same to the packet data generation part 136d.

When determined as a noise signal, the noise determination part 36e outputs a noise count signal to the noise counting part 36f along with the detector ID, and outputs a reset signal to the packet data generation part 36d.

(Operation of Detector Output Signal Processing Control Part)

The noise counting part 36f and the control part 36g have the same functions as those of the first embodiment and operate in the same manner.

The packet data generation part 136d appends the detector ID and the detection time information to the information on the detection energy value to thereby generate as a packet data (information on the detected γ-ray, information on detected radiation), and outputs the same to the data transfer part 37A. The data transfer part 37A periodically transmits the packet data, which is digital information outputted from the packet data generation part 36d of each detection signal processing part 134, for example, to one FPGA 31A provided outside the enclosure of the detector unit 102 (see FIG. 17) that houses twelve coupling substrates 120 therein. FPGA 31A transmits the digital information to the data processing device 58 via information transmission wiring connected to the connector 38A.

A rotation angle detected by an angle gauge (not shown) connected to the rotating shaft of a motor (not shown) that rotates the rotating support stand 57 is inputted to the data processing device 58. This rotation angle indicates the rotation angle of each radiation camera part 52, specifically indicating the rotation angle of each detector 21. On the basis of this rotation angle, the data processing device 58 calculates the position (positional information) on the pivoting track of each pivoting detector 21. Accordingly, a position (position coordinate) of the detector 21 obtained when a γ-ray is detected can be calculated. On the basis of the detector ID that detected a γ-ray, the data processing device 58 counts a γ-ray for which the detection energy value is equal to or greater than a set value. The detection energy value here is a summation of the detection energy value of each γ-ray detection signal if there is coincidence in a plurality of detectors 21 (four detectors 21 arranged side by side in a straight line in the (a) of FIG. 6) positioned on an extension of the radiation path of the collimator 55. This counting is carried out on each of the areas corresponding to increments of 0.50° with respect to the rotational center of the rotating support stand 57.

In addition, the data processing device 58 uses the positional information on the detector 21 and the count value (count information) of γ-rays both obtained when the γ-ray was detected to prepare tomogram information on the test object P for a position at which the radiopharmaceutical is concentrated, i.e., at the position of a malignant tumor. The tomogram information is displayed on the display device 13a. Information, such as the above-described packet data, count value and positional information on the detector 21 obtained through the simultaneous measurement, and the tomogram information, is stored in a storage device of the data processing device 58.

Moreover, according to the present embodiment, when determined as a noise in the noise determination part 36e, generating a packet data for the relevant signal and sending this packet data to the data processing device 58 are not allowed to be carried out, and therefore the signal-processing load of the digital ASIC 126 and FPGA 31 can be reduced.

Especially, in the conventional technique described in JP-A-2006-98411, an abnormality is determined based on a ratio of the counting rates between detectors disposed in multilayer, while the abnormality determination in the present embodiment can be made based on an output signal from one detector 21. Accordingly, in the case where the radiation detectors are not disposed in multilayer in the radial direction as described later, the present embodiment can be applied also to a PET apparatus using a scintillator and a photomultiplier.

Also when there is a channel of the detector 21 that frequently outputs noise, the noise counting part 36f detects a channel of the detector 21 outputting more noise count signals than a specified reference value, and outputs the abnormality determination to the control part 36g, whereby the control part 36g prevents the address calculation part 36a from carrying out address calculation to the output signal from the relevant detector 21 or from controlling ADC 25A, 25B. Accordingly, the signal processing load of the digital ASIC 126 and FPGA 31A can be reduced.

In this way, a noise signal can be prevented from being outputted from the digital ASIC 126 to the data processing device 58 as a packet data for image generation, so that SPECT images with an excellent image quality can be generated.

Moreover, the control part 36g checks the state of noise counts at a predetermined cycle for the detector 21 that has been determined as abnormal, and if the frequency of occurrence of a noise count satisfies a specified reference value, the detector 21 is recovered for SPECT image generation, thus enabling automatic recovery also from a temporary detector abnormality.

Furthermore, the control part 36g outputs to the operator console 13A the date-time information obtained when determined as abnormal and the detector ID for the detector 21 determined as abnormal. Accordingly, by viewing this information on the operator console 13A side during maintenance, an operator can determine a need for inspection of the detector unit 102 and the unit substrate and monitor a distribution of abnormal detectors 21.

In addition, since the correlation data stored in the noise determination part 36e and the reference value data for abnormality determination used by the noise counter 36f can be changed from the operator console 13A, reconfiguration that flexibly responds to a change in the waveform of an output signal due to a change with time of the output signal of the detector 21, a change in the installation environment of the SPECT apparatus 51, or the like, can be carried out.

In addition, in the first embodiment and the second embodiment, although pulseheight values outputted from the peak hold circuits are used, a sampled pulseheight value based on a timing signal may be used instead.

Incidentally, in the first embodiment and the second embodiment, the first and second slow systems 24B, 24C used in noise determination have a configuration wherein the first slow system 24B is used for measurement of an intended γ-ray detected energy and this first slow system 24B is also used for noise determination at the same time. This is for simplification of the circuit configuration. Two slow systems having mutually different time constants used for noise determination may be prepared totally independently of the slow system used for detection energy measurement of an intended γ-ray, i.e., three slow systems, may be prepared for one detector 21.

In addition, in the above-described first embodiment and second embodiment, the PET apparatus 1 and the SPECT apparatus 51 using the semiconductor radiation detector 21 as a radiation detector have been described, but the present invention is not limited thereto.

The present invention may be applied also to a PET apparatus and SPECT apparatus using a γ-ray detector obtained by combining the above-described scintillator of NaI or the like with a photomultiplier or a photodiode.

In this case, a γ-ray detector that employs a scintillator in the radial direction with respect to the body axis of the test object P is not disposed in multilayer but is dispose in one layer. Here, a plurality of γ-ray detectors are usually disposed in the circumferential direction as well as in the body axis direction.

Figure 21:
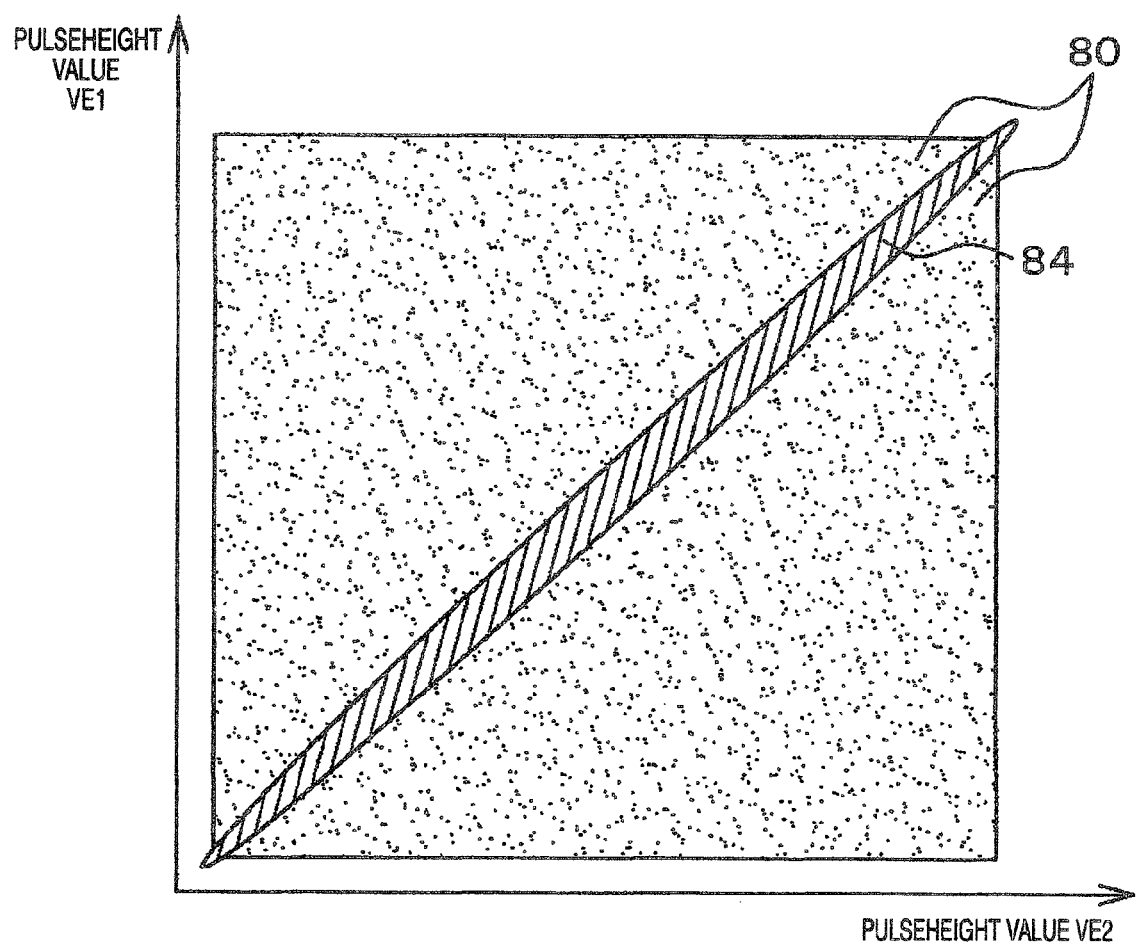
FIG. 21 shows a correlation between the pulseheight values VE1, VE2 outputted from the first slow system and the second slow system, the correlation being used in discrimination between a γ-ray detection signal and a noise in a noise determination part, when a combination of a scintillator, and a photomultiplier or a photodiode is used as the 7 detector.

In this case, a photomultiplier or a photodiode receives scintillation light outputted from a scintillator and then converts this into an electrical signal corresponding to the quantity of light. Accordingly, a difference in the detection signal waveforms resulting from a difference in the mobility between a hole and an electron will not occur unlike in the case of semiconductor radiation detectors. Accordingly, for the pulseheight values VE1, VE2 outputted from the first slow system and the second slow system, respectively, having mutually different time constants, if the pulseheight values VE1, VE2 are included in a region 84 shown in FIG. 21, the noise determination part 36e determines the output signal from a γ-ray detector as an intended γ-ray detection signal, while if these are included in a region 80, the noise determination part 36e determines this as a noise. Then, the noise counting part 36f and the control part 36g can function based on this determination result, as shown in the first embodiment and the second embodiment.

Moreover, the method for determining whether the output signal from a γ-ray detector is an intended γ-ray detection signal or a noise is not limited to the comparison of the pulseheight values of the output signals from the waveform shaper circuits having mutually different time constants described in the first embodiment and second embodiment. For example, as shown in FIG. 5 of the published literature "ASTRONOMY & ASTROPHYSICS SUPPLEMENT SERIES" (122, 357-369, (1997)), the discrimination may be carried out based on a correlation between the pulseheight value of an output signal from a γ-ray detector and the waveform selection (for example, based on the rising characteristics of the waveform).

In addition, in each of the above-described embodiments, the PET apparatus 1 and the SPECT apparatus 51 have been described, but the present invention may be applied to a γ camera, as well. The γ camera provides two-dimensional functional images and comprises a collimator restricting the incident angle of a γ-ray.

In addition, the PET apparatus 1 or the SPECT apparatus 51 may be combined with an X ray CT to configure a nuclear medical diagnosis apparatus.

In the nuclear medical diagnosis apparatus, a γ-ray from a test object may be scattered in a certain radiation detector and absorbed by another radiation detector, thereby providing energy to a plurality of radiation detectors. In such a case, as disclosed in JP-A-2003-255048, it may be determined, on the basis of the radiation detection information in two or more radiation detectors, whether a γ-ray before being scattered is a γ-ray from the radiopharmaceutical that is applied to a test object P, and if so, this γ-ray may be processed as an effective signal. Hereinafter, such a method is referred to as scattering radiation processing. The nuclear medical diagnosis apparatus includes a scattering radiation processing unit that identifies a plurality of radiation signals, the plurality of radiation signals resulting from radiation that scattered in a radiation detector, as one radiation signal based on an output signal outputted from a noise determination unit. Here, the scattering radiation processing unit may be any one of the packet data generation part 36d, FPGA 31, and the data processing device 12. Since FPGA 31 has more radiation signals than the packet data generation part 36d, it carries out the scattering radiation processing to a wider target area, and since the data processing device 12 has more radiation signals than FPGA 31, it carries out the scattering radiation processing to a wider target area. A noise determination unit on the upstream side of the scattering radiation processing unit may determine a relevant radiation signal as not being a noise, and then the scattering radiation processing unit may carry out scattering radiation processing based on an output signal after the determination. Thereby, the load of scattering radiation processing can be reduced. Moreover, because the scattering radiation processing increases effective signals, an accurate diagnostic image is expected to be obtained.

In the scattering radiation processing, energy information is one of the critical information in determining whether a γ-ray before scattering is a γ-ray coming from the radiopharmaceutical that is applied to the test object P. For this reason, a semiconductor detector excellent in energy resolution is preferably used as the radiation detector.

In carrying out the scattering radiation processing, an energy detected in a radiation detector is smaller than that of the original γ-ray. Generally, the noise signals emitted by a faulty detector mostly have a low energy, so even a noise signal, which is not problematic when the scattering radiation processing is not carried out, may result in a critical failure in carrying out the scattering radiation processing. According to the present invention, the contribution of a noise signal can be suppressed regardless of the magnitude of the energy, so that an accurate diagnostic image can be provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A nuclear medical diagnosis apparatus, comprising an image pickup device including: a plurality of radiation detectors that detect radiation from a test object or radiation passing through the test object; and a signal processing device connected to each of the radiation detectors, the signal processing device processing an output signal from the radiation detector, the nuclear medical diagnosis apparatus generating an image based on information on detected radiation outputted from the signal processing device of the image pickup device, wherein the signal processing device includes a noise determination unit which determines whether an output signal from the radiation detector is an intended radiation detection signal or a noise; and the apparatus capable of displayably outputting to an operator fault information on a faulty radiation detector which outputs an output signal determined as the noise.

2. The nuclear medical diagnosis apparatus according to claim 1, wherein the radiation detector is a semiconductor radiation detector using a semiconductor element.

3. The nuclear medical diagnosis apparatus according to claim 1, wherein at least one of a determination condition when the noise determination unit determines whether an output signal from the radiation detector is the intended radiation detection signal or a noise, and a condition when the determination unit determines a relevant radiation detector as faulty, can be set by an input unit from the outside.

4. The nuclear medical diagnosis apparatus according to claim 1, further comprising a scattering radiation processing device which, based on an output signal outputted from the noise determination unit, identifies a plurality of radiation signals as one radiation signal, the radiation signals resulting from radiation that scatters in a radiation detector.

* * * * *